United States Patent [19]

Akashi

[11] Patent Number: 4,792,819

[45] Date of Patent: Dec. 20, 1988

[54] CAMERA HAVING AUTOMATIC FOCUSING DEVICE

[75] Inventor: Akira Akashi, Yokohama, Japan

[73] Assignee: Canon Kabushiki Kaisha, Tokyo, Japan

[21] Appl. No.: 141,713

[22] Filed: Jan. 7, 1988

[30] Foreign Application Priority Data

Jan. 12, 1987 [JP] Japan .................. 62-004570
Jan. 12, 1987 [JP] Japan .................. 62-004571
Jan. 12, 1987 [JP] Japan .................. 62-004572

[51] Int. Cl.$^4$ .................................. G03B 3/00
[52] U.S. Cl. .................. 354/400; 354/402; 354/409; 354/195.11
[58] Field of Search ........... 354/400, 402, 403, 409, 354/195.1, 195.11, 407, 408

[56] References Cited

U.S. PATENT DOCUMENTS

| | | | |
|---|---|---|---|
| 4,341,447 | 7/1982 | Riber | 354/408 |
| 4,470,681 | 9/1984 | Johnson | 354/403 |
| 4,614,418 | 9/1986 | Ishizaki et al. | 354/408 |
| 4,639,110 | 1/1987 | Rinn et al. | 354/403 |
| 4,639,588 | 1/1987 | Shinoda | 354/403 |

FOREIGN PATENT DOCUMENTS 0256112 12/1985 Japan .................. 354/402

Primary Examiner—Russell E. Adams
Attorney, Agent, or Firm—Fitzpatrick, Cella, Harper & Scinto

[57] ABSTRACT

A camera having an automatic focusing device, capable of automatically driving a lens to a shooting lens position where it can simultaneously focus different objects on different positions. The camera has a focus detection circuit capable of detecting focusing positions where the lens is focused on the respective objects. When one of the focusing positions is beyond the limit of drive of the lens, the driving to the shooting lens position is judged to be impossible and the control for driving the lens to the shooting lens position is prohibited.

25 Claims, 7 Drawing Sheets

CAMERA HAVING AUTOMATIC FOCUSING DEVICE

BACKGROUND OF THE INVENTION

1. Field of the Invention

The present invention relates to a camera having an automatic focusing device which is capable of enabling two objects on different points to be photographed in a focused condition.

2. Related Background Art

The same applicant has proposed, in Japanese Patent Application No. 236841/1987 corresponding to a U.S. patent application filed on Sept. 28, 1987, a camera having an automatic focusing device which is capable of enabling two objects on different points to be photographed in a focused condition. In this camera, an intermediate lens position is determined between a first lens position where a first object A is focused and a second lens position where a second object B is focused, by dividing the distance between the the first and second lens positions at an appropriate ratio. Then, the amount of defocus between the first and the second lens positions is divided by circle of least confusion so that an aperture value is determined so as to enable the objects A and B to fall within the depth of focus of the lens positioned at the intermediate lens position, thereby ensuring that these objects are photographed in focused condition.

The lens position control system employed in the camera of the type mentioned above is designed to determine the intermediate lens position on the basis of the defocus amount between the first and the second lens positions where the first and the second objects are focused, by dividing the defocus amount at a suitable ratio. Therefore, when either the first lens position where the object A is focused or the second lens position where the object B is focused cannot be detected, the focus control system cannot determine the intermediate lens position, thus failing to shift the lens to such an intermediate lens position. In such a case, the user cannot photograph both objects in focused condition.

For instance, when the lens at the first lens position focusing the object A is driven by an amount equal to the defocus amount obtained by focusing the object B, the lens may be stopped by the closest limit before the lens travels the distance corresponding to the defocus amount. In such a case, the amount of defocus between the first lens position focusing the object A and the stopped lens position (closest limit) obtained during driving the lens for focusing the object B is different from the defocus amount between the first and the second lens positions focused at the first and the second objects A and B. Consequently, the lens cannot be driven to the intermediate lens position which is the position dividing the defocus amount determined by focus detections on two objects, thus failing to accomplish the desired photographing.

The camera of the type described also encounters a difficulty in photographing these two objects A and B when the amount of defocus between these objects is large, i.e., when these objects are largely spaced apart from each other.

SUMMARY OF THE INVENTION

One aspect of the invention of this application is proposed to overcome the above-described problems. Thus, according to one aspect of the present invention, there is provided a camera in which, when either one of the lens positions focusing the first and the second objects is beyond a limit of movement of the lens, e.g., the closest limit, the movement of the lens to the position focusing both objects is prohibited, thereby prohibiting photographing under conditions which do not meet the intended photographing purpose.

Another aspect of the invention of this application is proposed to overcome the above-described problems. Thus, according to another aspect of the present invention, there is provided a camera which has functions for judging, when two objects are spaced by a large distance from each other, that the photographing focused on both these objects is impossible, and for prohibiting driving of the lens to a position where both objects would be focused.

According to still another aspect of the present invention, there is provided a camera which, in the event that any sign of impossibility of focusing such as a too low contrast is given during focusing on the object B from a state focused on the object A, the driving of the lens for focusing both the objects A and B is prohibited, whereby the photographing of these two objects in focused conditions is possible only when the focus detection has been done safely on both of these objects.

According to a further aspect of the present invention, there is provided a camera of the type in which detection of focus on the object B is conducted from the state in which the object A has been focused and the lens is moved in accordance with the result of the detection of focus on the object B to the position focusing the point B, followed by driving of the lens to an intermediate position where both the objects A and B are focused, thereby enabling these objects to be photographed in focused condition, wherein the improvement comprises that, during the driving of the lens to the position focusing the object B, the state of driving of the lens is monitored to enable the lens to precisely move to the position focusing the object B, thus enabling the two objects to be photographed in a precisely focused condition.

According to a still further aspect of the present invention, there is provided a camera having a lens drive system of the type described and capable of determining the aperture value corresponding to the amount of defocus between both objects, thereby conducting an aperture control while shifting the aperture value to the smaller side according to the type of the lens mounted on the camera, thereby enabling both objects to be photographed in focused condition.

The above and other objects, features and advantages of the present invention will become clear from the following description of the preferred embodiments when the same is read in conjunction with the accompanying drawings.

DESCRIPTION OF THE PREFERRED EMBODIMENT

Figure 1:
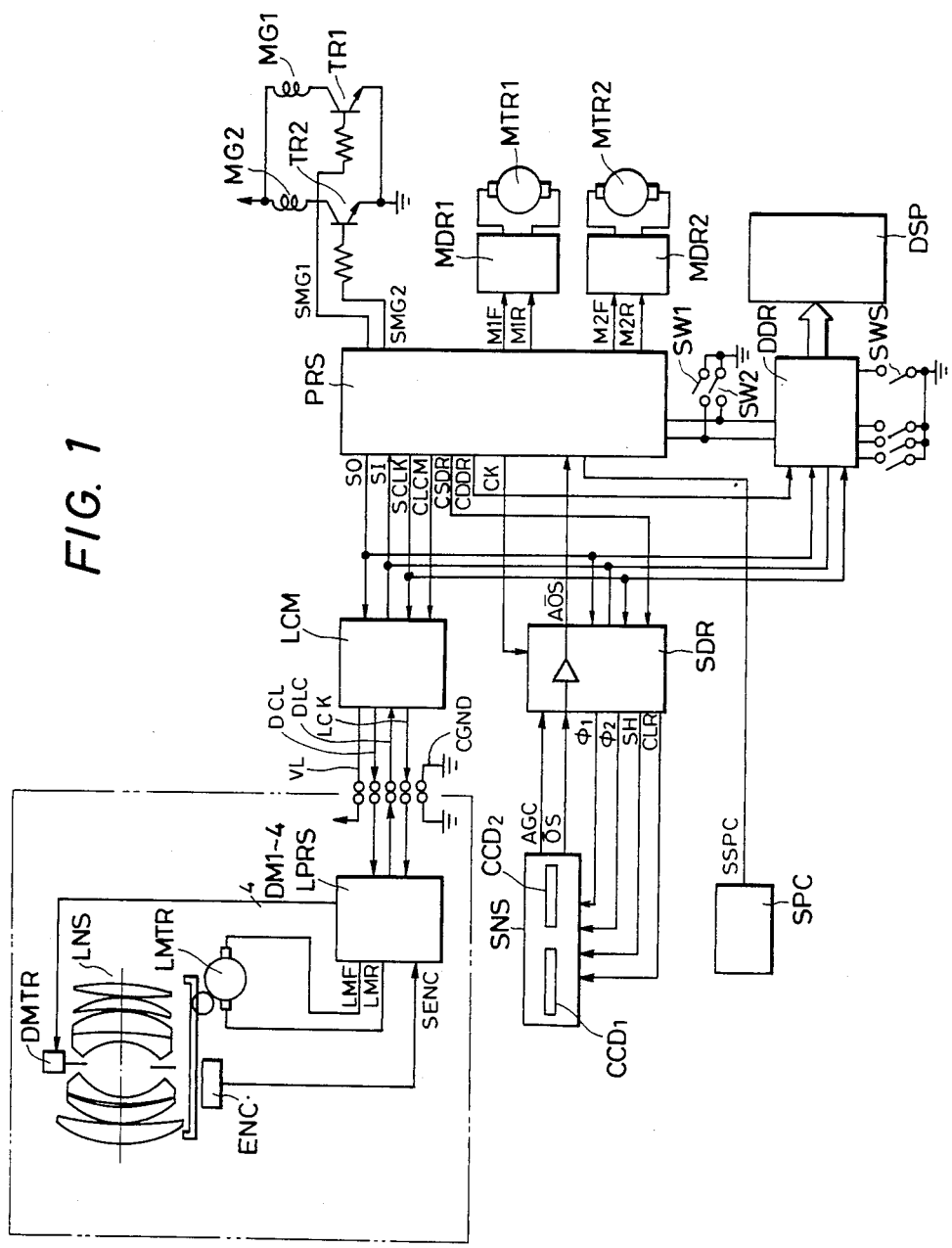
FIG. 1 is a circuit diagram of a camera in accordance with an embodiment of the present invention.

FIG. 1 is a circuit diagram showing a circuit in a camera of the present invention provided with an automatic focusing device. The camera has a controller PRS which is, for example, a single-chip microcomputer having ROM, RAM and A/D conversion functions. The controller conducts various camera tasks such as automatic exposure control, automatic focus detection, winding and rewinding of the film and so forth, in accordance with a later-mentioned program stored in the ROM.

The microcomputer PRS is adapted to communicate with peripheral circuits and a lens by means of communication signals SO, SI and SCLK so as to control the operations of various circuits and the lens.

The communication signal SO is a data signal derived from the PRS, while the communication signal SI is the data signal input to the PRS. Signal SCLK is a synchronizing signal for attaining synchronism between the signal SO and the signal SI.

A lens communication buffer circuit LCM is adapted to deliver the lens power supply VL to the lens during operation of the camera, and serves as a buffer for the communication between the camera and the lens when the level of the signal CLCM from the microcomputer PRS is high. The high level of the signal will be expressed as "H" hereinunder, while the low level of the same will be represented by "L", hereinafter.

When the microcomputer PRS outputs the signal CLCM of "H" level so as to output the SO signal representing a predetermined data in synchronization with the SCLK signal, the circuit LCM is appointed so that the buffer signals LCK and DCL for the signals SCLK and SO are outptt to the lens through the contact between the camera and the lens. At the same time, the buffer signal of the signal DLC from the lens in one-dot-and-dash line rectangle in FIG. 1 is output as the SI signal. Thus, the computer PRS inputs the SI signal as the lens data, in synchronization with the SCLK signal.

A driving circuit SDR is adapted for driving the line sensor device SNS. This drive circuit SDR is selected when the signal CSDR from the computer PRS is "H" so as to be controlled by the computer PRS by way of the signals SO, SI and SCLK.

A sensor device SNS includes, for example, a pair of CCD line sensors $CCD_1$ and $CCD_2$. The CCDs are adapted to be driven by CCD driving clocks $\Phi_1$ and $\Phi_2$ which are generated by the drive circuit SDR in response to the clocks CK from the computer PRS. A symbol SH represents a transfer signal which enables a transfer section to transfer the charges accumulated in the line sensors $CCD_1$ and $CCD_2$, while CLR represents a clear signal for clearing the charges on the line sensors $CCD_1$ and $CCD_2$. These signals are formed by the driving circuit SDR controlled by the computer PRS.

The output signal OS from the sensor device SNS is the image signal which is output in a time-series manner in synchronization with the clocks $101_1$ and $\Phi_2$ and which represents the image formed by the charges accumulated in the pixels of each sensor CCDs $CCD_1$ and $CCD_2$. These output signals OS are output for the respective bits of the CCDs $CCD_1$ and $CCD_2$ and, after being amplified by the amplifier circuit in the driving circuit SDR, input to the computer PRS as AOS signal. The computer PRS receives the AOS signal through the analog input terminal. The AOS signal is then A/D converted by the A/D conversion function in synchronism with the CK signal in the computer PRS, and is stored sequentially in predetermined addresses of the RAM.

The AGC signal, which also is an output signal from the SNS, is the output from an accumulation control sensor in the SNS and is input to the driving circuit SDR for the purpose of controlling the accumulation time in the sensors $CCD_1$ and $CCD_2$.

A symbol SP represents a photometry sensor adapted for receiving light through the shooting lens. The output SSPC from the photometry sensor SPC is delivered to the analog input terminal of the computer PRS and, after an A/D conversion, used as a signal an automatic exposure control (AE).

A symbol DDR represents a switch sense and display circuit which is adapted to be selected then the signal CDDR from the computer PRS is "H" so as to control the communication with the computer PRS in accordance with the signals SO, SI and SCLK. Namely, the switch sense and display circuit DDR serves to switch the content of display on the camera in accordance with the data from the computer PRS, and also to inform the states of various switches including the switches $SW_1$ and $SW_2$ operatively connected to a release button, as well as the states of a group of switches SWS which are turned on and off in response to the operations of various parts of the camera.

Driving circuits MDR1 and MDR2 are adapted for driving a film feeding motor MTR1 and a shutter charging motor MTR2. These driving circuits produce signals M1F, M1R, M2F and M2R so as to execute forward and backward driving of the motors.

Magnets MG1 and MG2 are intended for initiating the running of the front curtain and the rear curtain. These magnets are adapted to be energized through amplifier transistors TR1 and TR2 in accordance with signals SMG1 and SMG2 so as to activate the shutter in accordance with the computer PRS.

The switch sense and display circuit DDR, motor driving circuits MDR1, MDR2 and the shutter control are not described in detail because they do not constitute any critical portion of the invention.

A signal DCL which is input to the control circuit LPRS in the lens in synchronism with the synchronizing signal LCK carries data representing the instructions given by the camera to the lens. The patterns of operation of the lens are beforehand determined in relation to the content of the instructions.

A control circuit LPRS is adapted for analyzing the input instruction in accordance with a predetermined procedure, so as to effect controls such as focusing and aperture control, while outputting various lens parameters from the output DLC (full aperture value, i.e., F No., focal distance, coefficient between the defocus amount and lens feed amount, and so forth).

The camera of the illustrated embodiment is of a single-lens whole feed type. When a focusing instruction is given by the camera together with lens driving amount and direction, a signal LMF or LMR is output to a focus control motor LMTR in accordance with the amount and direction so that the motor LMTR is driven to shift the optical system along the optical axis thereby conducting focusing operation. The amount of movement of the optical system is monitored through an encoder circuit ENC which produces a signal SENC and, when the predetermined movement is completed, the signals LMF and LMR are turned to "L" thereby stopping the motor LMTR.

When an aperture control instruction is given from the camera, a stepping motor DMTR connected to the aperture mechanism in a manner known per se is controlled in accordance with the number of the aperture steps in the aperture control instruction. The stepping motor DMTR does not require any monitoring encoder because it can be open-controlled.

The circuit LPRS has a memory which stores the focal distance information of the lens (focal distance information concerning the zooming state in case of a zoom lens) and other parameters in predetermined addresses thereof. The circuit LPRS has a counter for counting the pulses as the aforesaid monitor signal SENC. The circuit LPRS also has a control circuit which operates in accordance with the value of the count of pulses corresponding to the amount of defocus during driving of the lens, in such a manner that, when the content of the counter has changed in an amount corresponding to the amount of defocus from the value before the driving of the lens, i.e., when the count value which changes in accordance with the amount of drive of the lens has become equal to the defocus amount, turns the drive signal LMF or LMR to "L" thereby stopping the motor LMTR. The circuit LPRS aloo forms a lens stopping signal when the motor control is stopped as a result of coincidence of the count value with the defocus amount. The circuit LPRS also includes a signal forming circuit which is capable of detecting any stop of the lens drive before the variance of the count value caused by the lens drive reaches the amount corresponding to the amount of defocus, thereby producing a lens drive unable signal. More specifically, the lens drive unable signal is produced when the formation of the monitor signal SENC is suspended for a predetermined time while the variance in the count value has not reached yet the amount corresponding to the defocus amount.

The display has LEDs which indicate the focused state, focus detection unable state and NG state, as well as display elements such as segments for displaying $DEP_1$ and $DEP_2$ which will be explained later.

The operation of the camera having the described construction will be explained hereinunder with specific reference to FIG. 2.

When a power supply switch (not shown) is turned on, power is supplied to the microcomputer PRS so that the latter executes the stored program.

Figure 2A:
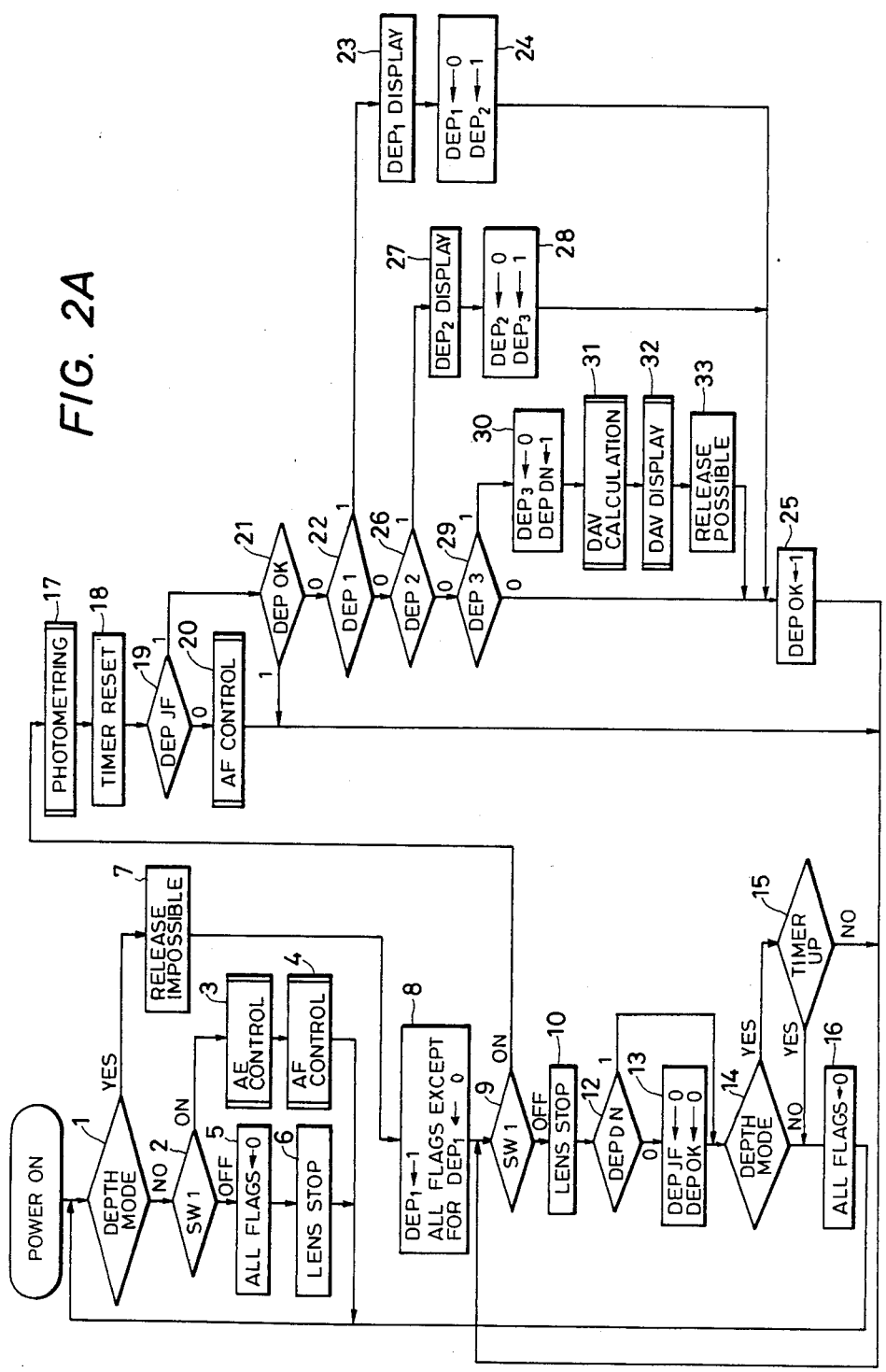
FIGS. 2A to 2F are illustrations of a program stored in a computer PRS incorporated in the embodiment shown in FIG. 1.

FIG. 2A is a flow chart illustrating the flow of the whole program mentioned above. When the execution of the stored program is commenced, the following Steps are sequentially executed starting from Step 1.

Step 1:

A judgment is conducted as to whether the present mode is a depth mode or not. This judgment is actually conducted by changing the signal CDDR of the computer PRS to "H" level so as to appoint the circuit DDR, inputting the SI signal representing the state of the mode selection switch in the input switch group SWS to the computer PRS, and judging the state of setting of this mode selection switch.

Upon confirming that an ordinary mode has been set, the process proceeds to Step 2.

Step 2:

The shutter button is of a two-staged type having two stroke portions. When the button is pressed through the first stroke portion, a switch $SW_1$ is turned on. Step 2 is intended for detecting the state of the switch $SW_1$. The judgment of the state of operation of the switch $SW_1$ is conducted in the same manner as that for the switch group SWS.

When the switch $SW_1$ has been turned on, the process returns to Step 1 after executing Steps 3 and 4, whereas, when the switch $SW_1$ has been turned off, the all the flags are set at "0" in Step 5. Then, the process returns to Step 1 after issuing the lens stop instruction in Step 6.

In consequence, steps 1, 2, 5 and 6 are executed repeatedly when the shutter button has not been operated while the ordinary mode has been set.

It is assumed here that the mode is set for the depth mode while the shutter button has not been operated.

In such a case, the change of the mode from the ordinary mode to the depth mode is detected in Step 1 in the course of repeated execution of Steps 1, 2, 5 and 6, so that the process proceeds to Step 7.

Step 7:

This step is intended for prohibiting the releasing operation.

Step 8:

All the flags except for the flag $DEP_1$ are set at "0", while the flag $DEP_1$ is set at "1".

Step 9:

In this step, the state of the switch $SW_1$ is judged. When the switch $SW_1$ is off, the process proceeds to Steps 10 onwards, whereas, when the switch $SW_1$ is on, the process proceeds to Step 17. It is assumed here that the switch $SW_1$ has been off. In this state, the lens stopping instruction is issued in Step 10 and the state of the flag DEPDN is judged in Step 12.

Since all the flags except for the flag $DEP_1$ are set at "0" in Step 8, the process proceeds to Step 13 so that the flags DEPJF and DEPOK are set at "0" and the set mode is judged again in Step 14. If the depth mode has been maintained, the process proceeds to Step 15, whereas, if the depth mode has been dismissed, the process proceeds to Step 16. In Step 15, a judgment is conducted as to whether a time measured by an internal timer has exceeded a predetermined time. The timer commences the counting of the time after setting of the depth mode.

When the time measured by the time has not exceeded the predetermined time, the process proceeds again to Step 9. Conversely, when the predetermined time has been exceeded, the process proceeds to Step 15. Thus, Steps 9 to 16 are repeatedly executed unless a predetermined time elapses after the depth mode is set. When the switch $SW_1$ is turned on within this period, the process proceeds to Step 17. When the switch $SW_1$ is not turned on within the above-mentioned predetermined time, or when the depth mode is dismissed within this time, the process proceeds to Step 16 in which all the flags are set at "0" and the process returns again to Step 1.

Therefore, even if the depth mode hss been set, this mode is dismissed and the mode is reset to the ordinary mode unless the shutter button is operated.

It is assumed here that the shutter button is pressed to complete its first stroke portion within the predetermined time after the setting of the depth mode. In such a case, the process proceeds to Step 17 as explained above, so that a photometry routine is commenced. In this routine, the output SSPC of the photometry sensor SPC, which measures the light through the shooting lens, is input to the computer PRS and is A/D converted into a digital value which is stored in the memory.

After the completion of the photometry routine, the process proceeds to Step 18.

Step 18:

In this step, the timer mentioned above is reset and the counting of time is commenced again from the initial state.

Step 19:

In this step, the state of setting of the flag DEPJF is detected. Since the flags other than $DEP_1$ were set at "0" in Step 8, the process proceeds to Step 20.

Figure 2B:
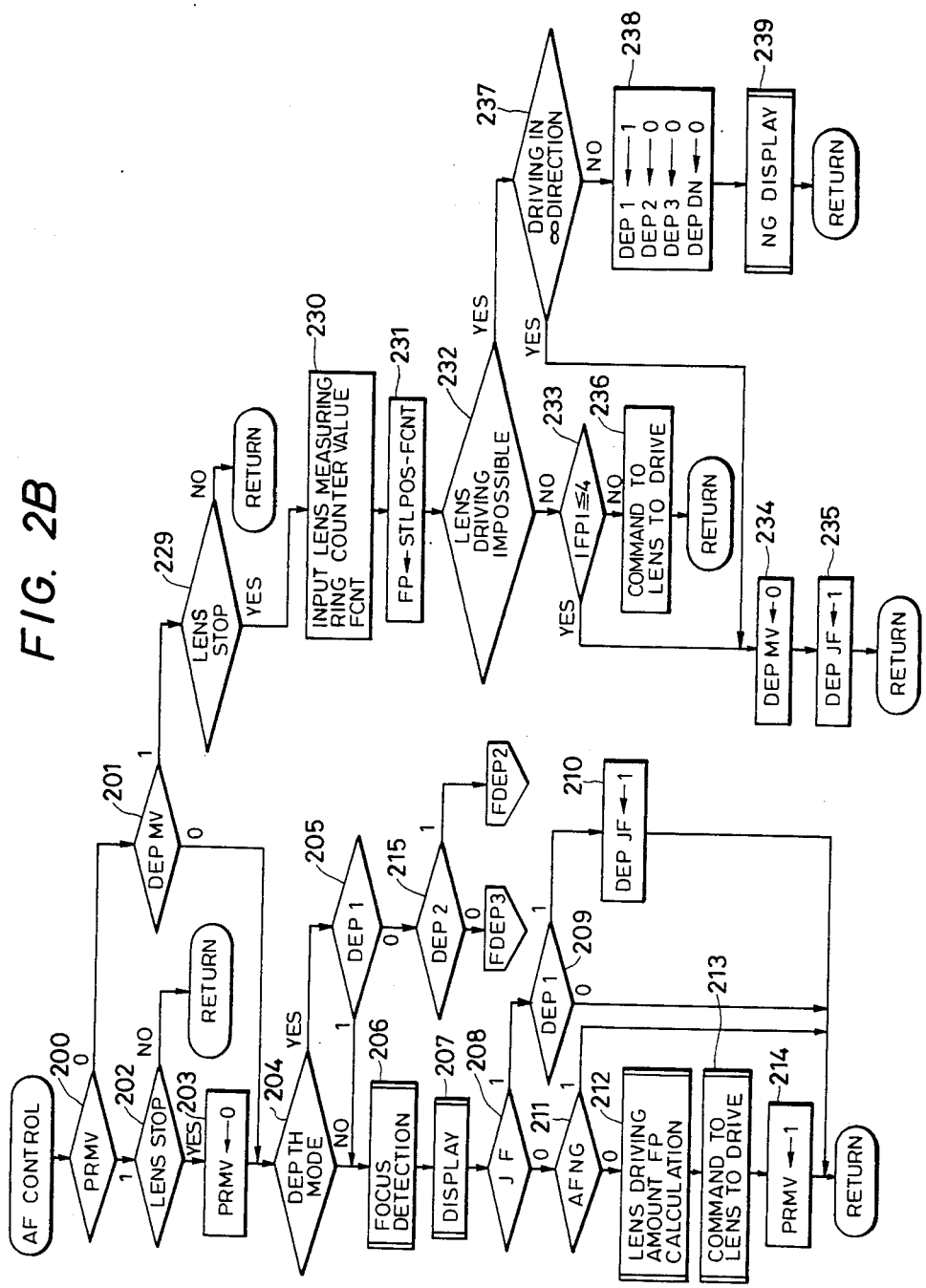
Figure 2C:
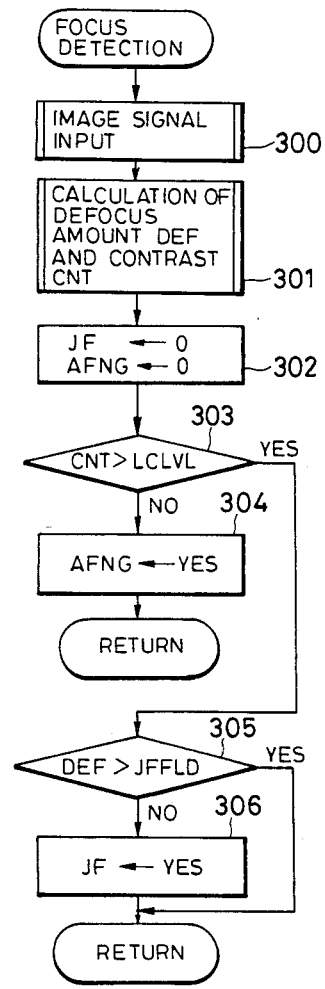
Figure 2D:
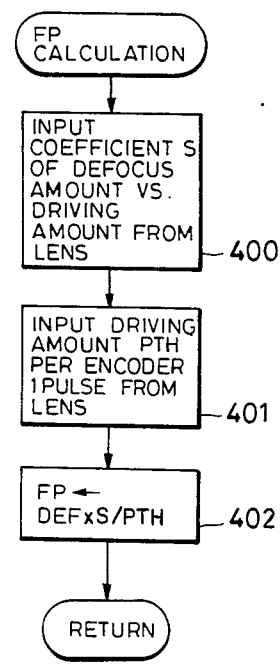
Figure 2E:
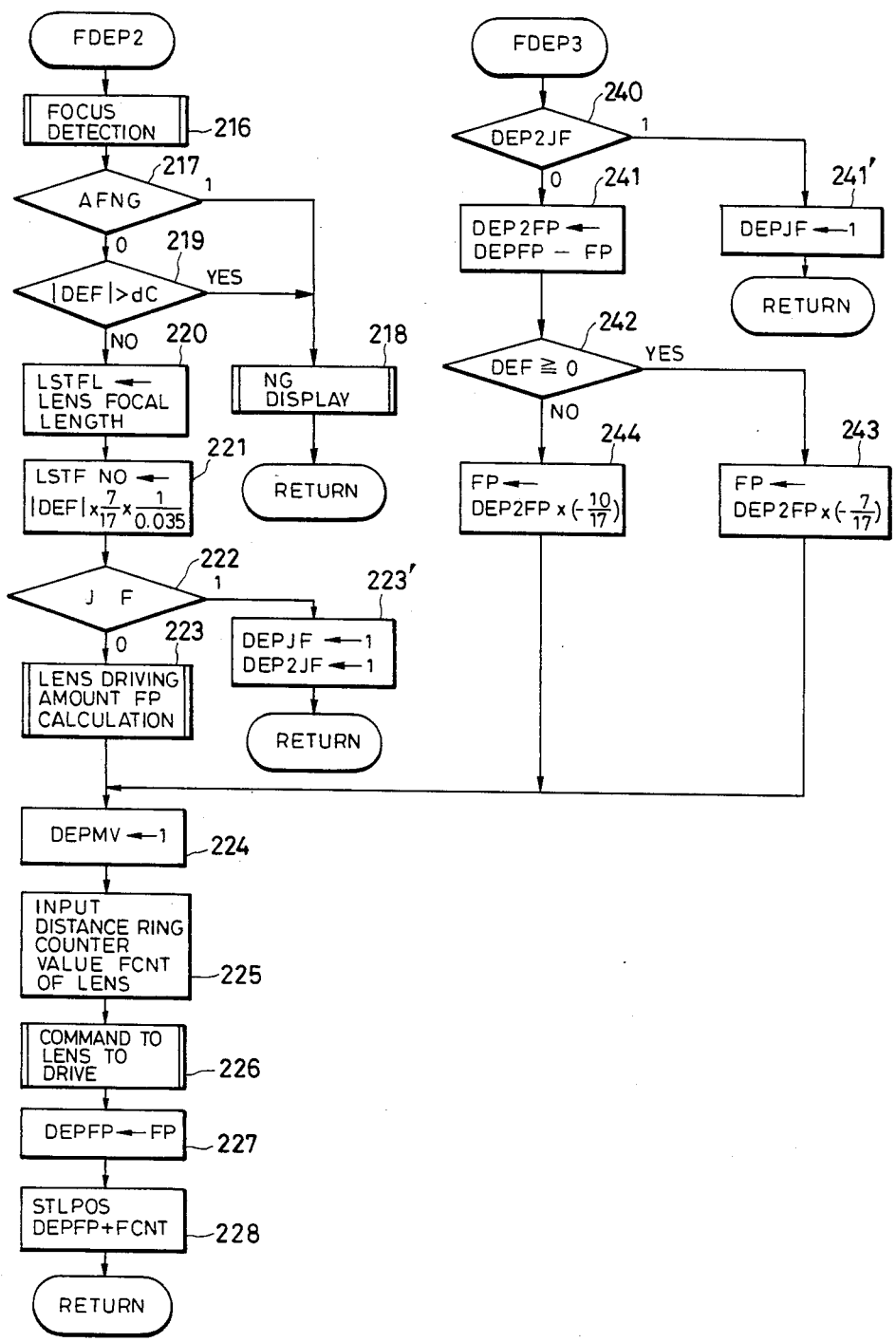

Step 20 is an AF control sub-routine which is started from Step 200 in FIG. 2B.

A description will be made as to the first cycle of operation conducted in the AF control sub-routine in the depth mode.

Step 200:

This step is for setting the state of the flag PRMV. Since this flag also has been set at "0", the process proceeds to Step 201.

Step 201:

This step is for detecting the state of setting of the flag DEPMV. This flag also has been set at "0" so that the process proceeds to Step 204 in which a judgment is conducted as to whether the set mode is a depth mode or not. Since the operation mode has been set in the depth mode as explained above, the process proceeds to Step 205.

Step 205:

In this step, the state of setting of the flag $DEP_1$ is detected. As the flag $DEP_1$ has been set at "1" since Step 8, the process proceeds to Step 206.

Step 206 is a step for executing a focus detection sub-routine. This sub-routine is started from Step 300 shown in FIG. 2C. This sub-routine will be described hereinunder.

Step 300:

This step executes an image signal input sub-routine. In the image signal input sub-routine, the CSDR is changed to H by the computer PRS so that the drive circuit SDR is selected. Then, the SO signal is transmitted to the driving circuit SDR. In this case, the signal SO serves as a accumulation start signal so that the driving circuit SDR operates in response to this instruction so as to deliver the signal CLR to the line sensor device SNS thereby clearing the image accumulation signal in the line sensor, followed by the accumulation of charged in accordance with the input image. The line sensors $CCD_1$ and $CCD_2$ of the line sensor device SNS receive image light beam which is impinged through the shooting lens, so that the image positions on sensors $CCD_1$ and $CCD_2$ are determined in accordance with the focusing states. To explain in more detail, when the object has been focused, an identical image is formed on the corresponding portions of the $CCD_1$ and $CCD_2$, whereas, when the lens is focused in front of or behind the object, the image patterns on both CCDs are symmetrically offset relative to each other in accordance with the direction and the amount of the defocusing. It is therefore possible to detect the direction and amount of the defocus by detecting the direction and amount of offset of the images on both CCDs relative to each other.

The image patterns formed on the $CCD_1$ and $CCD_2$ in the focused state are accumulated on the reseective CCDs for a predetermined period of time after the clear of the image signals. Then, the signal SH and the clocks $\Phi_1$ and $\Phi_2$ are delivered from the driving circuit SDR to the sensor device SNS. The period of accumulation of the image patterns is determined in accordnnce with the output AGC of the accumulation control sensor in the SNS.

When the signal SH and the clocks $\Phi_1$ and $\Phi hd 2$ are delivered to the sensor device SNS, the the image signals accumulated on the pixels of the eespective sensors $CCD_1$ and $CCD_2$ are output in a time-series manner as the output OS, from the output of the sensor device SNS. The series of outputs are then amplified in the amplifier circuit incorporated in the driving circuit SDR and are successively input to the computer PRS. The computer PRS converts the signal AOS into digital values by its internal A/D conversion function, and stored the thus obtained digital values in a predetermined RAM.

As a result of the series of operation described above, image signals corresponding to the image patterns on the $CCD_1$ and $CCD_2$ are stored in the RAM as digital values, whereby the sub-routine is completed and the process proceeds to Step 301.

Step 301:

This step executes a defocus amount computing sub-routine. In the sub-routine, the amount and direction of the offset from the focal point are computed as the defocus amount DEF, from the digital values corresponding to the image patterns on the sensor $CCD_1$ and the sensor $CCD_2$ determined through the sub-routine. The actual method for calculating the defocus amount is not described because it does not constitute any critical poriion of the invention. Briefly, since the degree of focusing is related to the degree of coincidence between the image patterns on both CCDs $CCD_1$ and $CCD_2$, the digital values corresponding to these patterns are compared so as to determine the degree of coincidence between these data, whereby the defocus amount DEF in terms of the direction and amount of defocus is obtained. In this sub-routine, the image contrast CNT also is determined from the digital, values corresponding to the image patterns on the sensors $CCD_1$ and $CCD_2$. The method of determining the contrast is not described because such a method is known.

Step 302:

Flags JF and AFNG are set at "0" in this step.

Step 303:

The contrast CNT is compared with the constant value LCLVC and, when the condition of CNT<LCLVC is met, i.e., when the contrast is low, the flag AFNG is set at "1" in Step 304, whereby the focus detection sub-routine is completed to proceed the process to Step 207.

Conversely, when the condition of CNT>LCLVC is met, i.e., when the contrast is high enough, the process proceeds to Step 305 in which a judgment is conducted as to whether the computed defocus amount DEF falls within a predetermined defocus amount range JFFLD which is regarded as being materially focused state. If the condition of DEF<JFFLD is met, a flag JF is set at "1" in Step 306 and the focus detection sub-routine is completed to proceed the step to Step 207. When the condition of DEF>JFFLD is met, on the other hand, the focus detection sub-routine is completed without setting the flag JF at "1" and the process proceeds to Step 207.

In the focus detection sub-routine mentioned above, the flag AFNG is set at "1" when the contrast is low, whereas, when the contrast is high enough and the state of defocus can be regarded as being materially a focused state, the flag JF is set at "1". However, when the amount of defocus exceeds the range which can be regarded as being materially focused state, the process returns without setting the flag JF at "1".

After the detection and evaluation of the state of focus in the above-explained sub-routine, a display sub-routine is executed in Step 207. In the displayed sub-routine, if the flag AFNG has been set at "1", the computer PRS operates to make the signal CDDR take the "H" level so as to appoint the circuit DDR and delivers the display signal as the SO signal to the circuit DDR, thereby lighting up the LED for indicating the focus detection unable state. Conversely, when the flag JF has been set at "1", the LED for indicating the focused state is made to light up.

After the display of the state of focusing in the display sub-routine, the process proceeds to Step 208.

Step 208:

In this step, the state of setting of the flag JF is judged. When the flag JF has been set at "1", the state of the flag $DEP_1$ is judged in Step 209. Since the flag $DEP_1$ has been set at "1", Step 210 is executed to set the flag DEPJF at "1" and then the process returns to execute Step 9 again.

When the flag JF has been set at "0", the state of the flag AFNG is judged in Step 211, whereas, when the AFNG has been set at "1", the process is returned to Step 9 again.

When both the flags JF and AFNG have been set at "0", Steps 212 onwards the executed.

Step 212:

This step executes computation of lens drive amount which will be referred to as FP computing sub-routine. The sub-routine is commenced from Step 400 shown in FIG. 2D.

Step 400:

In this step, a coefficient S of defocus amount vs driving amount is input from the lens. To this end, the computer PRS changes the signal CLCM to "H" level so as to appoint the circuit LCM, and the circuit LPRS in the lens is appointed through the circuit LCM. At the same time, the signal SO is delivered to the circuit LPRS as a signal DCL to the above-mentioned circuit LPRS. This signal is an instruction for reading the coefficient S, so that the circuit LPRS delivers the aforementioned coefficient S stored in the RAM in accordance with the signal SO and delivers the coefficient S as the signal DLC to the circuit LCM. The circuit LCM then inputs the signal DLC as the signal SI to the computer PRS the coefficient S is set in the computer.

Step 401:

In this step, the driving amount PTH per encoder 1 pulse is input from the lens. The input of the driving amount PTH is executed in the same manner as the coefficient S.

Step 402:

In this step, DEF×S/PTH is computed by using the coefficient S and driving amount PTH input through the reading operation.

As explained before, PTH is the driving amout per one pulse from the encoder which is constituted by detecting the driving amount of the lens LNS and outputs one pulse per each unit amount of driving of the lens.

The coefficient S of the defocus amount vs driving amount. The product of the defocus amount DEF and the coefficient S, i.e., DEF×S, represents the amount by which the lens is driven for a given amount of defocus. Thus, the DEF×S/PTH represents the number of pulses output from the encoder NEC in accordance with the defocus amount. The distance of movement of the lens corresponding to this number of pulses corresponds to the computed defocus amount.

After determining the pulse number FP corresponding to the pulse number FP corresponding to the defocus amount in the FP computing sub-routine, the process proceeds to Step 213.

In Step 213, a lens driving sub-routine is executed. In this sub-routine, the computer PRS operates to set the signal CLCM at "H" level so as to appoint the circuit LPRS as explained before, while transmitting the pulse number FP to the circuit LPRS as the signal SO. In the circuit LPRS, the signal LMF or the signal LMR is set at "H" so as to activate the motor LMTR.

The above-mentioned pulse number FP is determined in accordance with the defocus amount and includes the direction of offset from the focused position, i.e., the direction in which the lens is to be driven. The signal LMF or the signal LMR is set at "H" level in accordance with the driving direction information, whereby the signal LMF or LMR is set at "H" level and the lens is driven towards the focusing position.

After commencing the driving of the lens in Step 213, the process proceeds to Step 214 so as to set the flag PRMV at "1", whereby the AF sub-routine is completed to return the process to Step 9.

When the above-mentioned judgment of focusing is conducted in the initial AF control sub-routine in response to the first on-state of the switch $SW_1$, the process returns to Step 9 after the display of the focused state. If the switch $SW_1$ is still held in on state, the process proceeds to Step 17 in which the photometry sub-routine is executed and the state of setting of. the flag DEPJF is judged after resetting of the timer in Step 18. Since the flag DEPJF has been set at "1", the process proceeds to Step 21 so that the state of setting of the flag DEPOK is conducted in Step 21. Since the flag DEPOK has been initially set at "0", the process proceeds to Step 22.

Therefore, when the focused state is detected in the AF control routine in the first on-state of the switch $SW_1$ in the depth mode, the process proceeds to Step 22 after the display of the focused state.

Conversely, when the focus detection unable state is detected in the first on-state in the depth mode, the steps 9, 17, 18, 19 and 20 are repeatedly executed insofar as the on state of the switch $SW_1$ is maintained, thus repeating the focus detecting operation.

When the lens driving instruction is given on the basis of the defocus amount to drive the lens to the focus position is given in the AF control sub-routine in the first on state of the switch $SW_1$ in the depth mode, the steps 9, 17, 18, 19 and 20 are repeatedly followed provided that the switch $SW_1$ is held on after the execution of the initial AF control sub-routine. In the AF control sub-routine in Step 20 during the repetition of these steps, "1" is detected through the detection of the flag PRMV in Step 200, so that Step 202 is executed to judge whether the lens has been stopped or not.

A description will be made hereinunder as to the operation for judging the stopping of the lens drive.

In this embodiment, the pulse number FP representing the amount of driving of.the lens is input to the circuit LPRS and pulses are output from the encoder ENC in accordance with the movement of the lens LMS. The number of pulses from the encoder NEC is counted by the counter in the circuit LPRS and, !when the count value has coincided with the input pulse number FP, the circuit LPRS operates to change the ignal level of the signal LMF or LMR to "L", thereby stopping the motor LMTR.

The pulses from the encoder are up-counted or down-counted in accordance with the direction of driving of the lens. According to this method of controlling the driving of the lens, it is possible to judge within the circuit LPRS that the motor stopping operation for stopping the motor LMTR has been stopped because the number of the input pulses has coincided iith the number of pulses from the encoder. This circuit forms a lens stop signal when the above-mentioned lens driving control is not conducted.

In consequence, the computer PRS appoints the circuit LPRS as described above and reads the lens drive stop signal, thus conducting the judgment concerning the stop of the lens in Step 202.

If the lens has been forcibly stopped by, for example, contacting the infinite limit of the lens stroke, the lens is made to stop while the pulses from the encoder ENC counted by the counter has not reached yet the pulse number FP. In such a case, the encoder ENC stops to produce pulses even though the number of the pulses counted by the counter is still different from the pulse number FP. The circuit LPRS is adapted to detect that the production of the pulses from the encoder ENC is suspended for a predetermined time. Upon detection of this fact, the circuit LPRS operates to set the signal LMF or LMR at "L" so as to stop the motor, while forming a lens drive unable signal and storing this signal in the RAM provided in this circuit. Thus, the circuit LPRS is capable of discriminating the state in which the lens has been stopped safely after driving to the focusing position from an extraordinary state in which the lens has been stopped forcibly by, for example abutting the closest limit or infinite limit of the lens stroke.

If the lens stop signal is not detected in Step 202, i.e., when the lens is still being driven, the AF control sub-routine is stopped without delay and the process is returned again to Step 9.

When the lens is being driven by the amount corresponding to the defocus amount, Steps 9, 17, 18, 19 and 20 (200 to 202) are cyclically executed. When the amount of driving of the lens, i.e., the number of pulses from the encoder ENC has become equal to the pulse number FP computed in the above-mentioned FP computing sub-routine, the circuit LPRS for detecting the coincidence changes the output LMF or LMR to "L" so that the motor LMTR is stopped after driving the lens by the amount equal to the defocus amount. When the lens has been driven by the amount equal to the defocus amount during repeating the above-mentioned Steps, it is judged in Step 202 that the lens drive is stopped so that the flag PRMV is set at "0" in Step 203. Then, Steps 204, 205 and 206 are executed sequentially as described before.

In this state, the lens has been driven by the amount equal to the defocus amount, so that the focused state is detected in the focus detecting operation conducted in Step 206. The process then proceeds to Step 208, followed by Steps 209 and 210.

Therefore, when the lens is driven by the first on state of the switch $SW_1$ in the depth mode, the lens is shifted until the lens is focused with respect to the object, and once the focused state is detected, the process proceeds to Step 22 as in the case of the above explained judgment of the focused state.

The AF control sub-routine is repeated also when it is unable to conduct the focus detecting operation. Therefore, whenever the focus detection unable condition has been dismissed, the lens is driven to the focusing position and the process proceeds to Step 22.

To sum up, as a result of the depth processing under the first on state of the switch $SW_1$ in the depth mode, the lens is once moved to the position where it focuses the object and then the process proceeds to Step 22.

When Step 22 is commenced after the focusing of the object, the state of the flag $DEP_1$ is judged in this step. Since the flag $DEP_1$ has been set at "1" as explained before, the process proceeds to Step 23.

Step 23:

This step is to display the state of the flag $DEP_1$. More specifically, in this step, the computer PRS changes the signal CDDR to "H" so as to appoint DDR so that it delivers a $DEP_1$ display signal as the signal SO to the circuit DDR, thereby causing the circuit DDR to display the state of the flag $DEP_1$ by means of the display segments in the display DSP, whereby the user can understad that the first depth processing is completed.

Thereafter, the process proceeds to Step 24 in which the flag $DEP_1$ is set at "0", while the flag $DEP_2$ is set at "1". Subsequently, the flag DEPOK is set at "1" and then the process proceeds to Step 9 again.

If the switch $SW_1$ is still maintained in on state, Steps 17, 18, 19 and 21 are executed in sequence. In this case, since the flag DEPOK has been set at "1", the process returns from Step 21 to Step 9. Therefore, as long as the switch $SW_1$ is kept on after the completion of the first depth processing, Steps 9, 17, 18, 19 and 21 are repeatedly executed so that the continues to be held in the initially focused position. If the shutter button is released from the manual force to turn the switch $SW_1$ off, the repetition of Steps 9, 17, 18, 19 and 21 is finished and the process proceeds to Step 12. As explained before, the process commenced with Step 12 is to set the flags DEPJF and DEPOK at "0" and to judge whether the depth mode is maintained or whether the predetermined has elapsed from the turning off of the switch $SW_1$ after the completion of the first depth processing. When the operation mode has been reset to the ordinary mode, process returns to Step 1 on condition that the switch $SW_1$ is kept in off state for a predetermined time, whereby the depth mode is canceled.

Conversely, if the release button is pressed again to turn the switch $SW_1$ on within the above-mentioned time while the depth mode is maintained, the process proceeds to Step 17 again so that a second depth processing is commenced.

The second depth processing is as follows.

In Step 17, the photometry sub-routine is conducted and then the timer is reset in Step 18 so as to start the counting of time. The process then proceeds to Step 19. In this state, the flag DEPJF has been set at "0" in Step 13 while the switch $SW_1$ is kept off, so that the AF cnntrol sub-routine is executed following execution of Step 19.

As described before, Step 200 is executed in the AF sub-routine. At this moment, the flag PRMV is set at "0" so that the process proceeds from Step 200 to Step 201. In this state, since the flag DEPMV also has been set at "0", the process proceeds to Step 204 in which a judgment is conducted as to whether the mode is a dppth mode or not. Since in the described case the depth mode has been selected, the process proceeds to Step 205. The flag $DEP_1$ was set at "0" in Step 24 before the second depth processing is commenced, so that the process proceeds to Step 215.

Step 215:

This step is to judge the state of a flag $DEP_2$. Since the flag $DEP_2$ has been set at "1" in Step 24, the process proceeds to Step 216 shown in FIG. 2E in which the focus detection sub-routine explained before is conducted to judge the state of focusing on the object which is aimed in the second on state of the switch $SW_1$ in the depth mode.

When the focus detection is impossible due to a too low contrast, the flag AFNG is set at "1". This state of the flag AFNG is detected in Step 217 so that the process proceeds to Step 218.

Step 218:

This step is to execute an NG display sub-routine. In this sub-routine, the LED indicative of the focus detection unable state is lit on as in the display routine described before and, thereafter, the AF control sub-routine is completed.

If the flag AFNG has not been set at "1" when the focus detection sub-routnne is conducted in Step 216, i.e., when the contrast is high enough, the process proceeds to Step 217 and then to Step 219.

Step 219:

In this step, a judgment is conducted as to whether the defocus amount determined in the focus detection sub-routine is greater than a predetermined value dC. If the condition of DEF>dc is met, the process proceeds to Step 218 in which the focus detection unable state is displayed, thus completing the AF control sub-routine.

Therefore, when a too low contrast or a too large defocus amount is detected in the second depth processing, the AF control sub-routine is complete without delay and the process returns to Step 9 without delay.

If the switch $SW_1$ is still maintained in on state, the aforementioned repetition of Steps 9, 17, 18, 19 and 20 is commenced. These steps are repeated sequentially until the fact that the contrast is high enough and the fact that the defocus amount DEF meet the condition of DEF<dc (note dc>JFFLD) are detected in the focus detection sub-routine. Upon detection of these facts, the process proceeds to Step 220.

When the sufficiently high contrast and the defocus amount DEF<dC are detected in the focus detecting operation in the first execution of Step 216, the process proceeds directly to Step 220 without repeating the above-described focus detecting operation.

Thus, in the second depth processing, the depth processing is terminated when the defocus amount is greater than a predetermined value, for the following reason, because, when the distance between the object focused in the first depth processing and the object focused in the second depth processing is too large, it is materially impossible to obtain a lens position where both objects are substantially focused. That is, the processing in the depth mode is impossible.

In consequence, the process proceeds to Step 220 in which information concerning the focal distance of the lens is input to the memory LSTFL.

The input of the focal distance information is controlled by the computer PRS which sets the signal CLCM at the "H" level so as to select the circuit LPRS through the circuit LCM, thereby reading the focal distance information stored in the circuit.

When the lens is a zoom lens, the focal distance information corresponding to the set zooiing state is read.

Thus, the process proceeds to Step 221 after reading the focal distance information in Step 220.

Step 221:

In this step, an aperture value which enables the lens to substantially focus both the object focused in the first depth processing and the object focused in the second depth processing is determined from the computed defocus amount.

It is assumed here that, in the first depth processing, an object A is focused by the lens when the lens is set at the position $DEP_1$. Thus, the lens has been moved to the position $DEP_1$ as a result of the first depth processing. It is also assumed that another object B is located at such a position that is focused by the same lens when the lens is moved to a position $DEP_2$. When the second depth processing is conducted on the object B, the defocus amount of the object B from the lens position DEF is detected as the amount of defocus DEF between the lens positions $DEP_1$ and $DEP_2$.

In the depth processing of the camera according to the present invention, a position $DEP_3$ is determined as a position which is at the 7/17 of the defocus amount between two objects as measured from the closer side towards the infinite side, and the value obtained by dividing the amount of defocus between the lens positions $DEP_3$ and $DEP_2$, i.e., $DEP \times 7/17$ by the minimum confusion circle diameter of 0.035 mm is used as the controlled aperture value.

In general, when there are two objects A and B which are focused by a lens when the lens is located at positions $DEP_1$ and $DEP_2$, respectively, it is possible to determine a focal depth which enables both the objects A and B to be materially focused simultaneously, by locating the lens at an intermediate position $DEP_3$ which divides the distance between the focal positions $DEP_1$ and $DEP_2$ and adopting an aperture value which is obtained by dividing by the minimum confusion circle the defocus amount between the lens position $DEP_3$ and the one of the focal points $DEP_1$ and $DEP_2$ which are the true focal positions of the lens for the respective objects A and B.

The present invention makes use of this principle. Namely, according to the invention, an aperture value is determined which enables the closer object B to be sufficiently focused by the lens located at the position $DEP_3$, by computing $DEF \times 7/17 \times 1/0.035$. Though the thus obtained aperture value does not provide a focal depth which covers the infinite side object focal position $DEP_1$, this does not cause any inconvenience because an ordinary lens has such a characteristic as to enable the infinite side side object can be photographed in a satisfactorily focused state even when it is not covered by the focal depth. For this reason, according to the present invention, the intermediate focal position $DEP_3$ is determined as the point which is at 7/17 of the distance between two focal positions $DEP_1$ and $DEP_2$ as measured from the closer focal position.

Thus, in Step 221, $DEF \times 7/17 \times 1/0.035$ is computed to determine the aperture value which provides a focal depth capable of enabling the lens to materially focus on two objects A and B. After storing this aperture value in a memory LSTFNO, the process proceeds to Step 222.

Step 222:

In this step, a judgment is conducted whether the flag JF has been set at "1" as a result of the focal detection sub-routine conducted in Step 216.

If the flag JF has been set at "1", the process proceeds to Step 223 in which flags DEPJF and DEP$_2$JF are set at "1", thus completing the AF control sub-routine.

The fact that the level "1" of the flag JF is detected in the second depth processing conducted in Steps 222 and 223 means that the object aimed at in the second depth processing is located substantially at the same position as the object aimed at in the first depth processing. Otherwise, the process proceeds to Step 223.

It is assumed here that the objects aimed at in the first depth processing and the second depth processing are spaced apart so that the process has proceeded to Step 223. This step is for executing the aforementioned FP computing sub-routine in which the pulse number FP corresponding to the defccus amount relative to the object in the second depth processing is determined. The process then proceeds to Step 224.

Step 224:
In Step 224, "1" is set in the flag DEPMV.

Step 225:
This step is for inputting the count value FCNT representing the instant position of the lens.

As has been described, the circuit LPRS receives from the encoder FNC the pulses of a number which represents the amount of drive of the lens. The drive of the lens is controlled by counting these pulses and judging whether the counted number of pulses has become equal to the number of pulses FP corresponding to the amount of defocus. Thus, the pulses from the encoder ENC are counted by the circuit LPRS and the counted value is input to the computer PRS as the count value FCNT representing the instant position of the lens. More specifically, the computer PRS sets the signal CLCM at "H" level so as to appoint the circuit LPRS and demands the count value by the SO signal, whereby the count value is input to the computer RPS a the signal SI.

Step 226:
In this step, the lens is driven towards the focusing position in accordance with the defocus amount mentioned above, as in the case of the lens driving sub-routine explained before. That is, the lens is driven by an amount corresponding to the defocus amount from the lens position obtained in the first depth processing to the position obtained in the second depth processing.

Step 227:
The pulse number FP corresponding to the above-mentioned defocus amount, determined in Step 223, is input to the memory DEPFP.

Step 228:
The pulse number FP corresponding to the defocus amount stored in the memory is added to the count value FCNT which represents the instant position of the lens and which was input before the lens drive is commenced, and the sum is input to the memory STLPOS, whereby the information concerning the position or distance to be traveled by the lens is set in the memory STLPOS.

For instance, it is assumed that the lens is set at the position DEP$_1$ as a result of the first depth processing, and that the count value obtained in this state is N$_1$. It is also assumed that the object aimed at in the second depth processing is located at such a position that can be focused in the second depth process by the lens located at the position DEP$_2$. In such a case, the driving amount FP necessayy for driving the lens from the position DEP$_1$ to DEP$_2$ is determined in Step 223. The pulse number FP is assumed here to be N$_2$.

In such a case, the memory STLPOS stores a value N$_2$+N$_1$. This means that the lens has to be moved from the position DEP$_1$ represented by the counter value N$_1$ to the position DEP$_2$, by an amount corresponding to the pulse number N$_2$. Thus, the sum N$_1$+N$_2$ represents the counter value which should have been counted when the lens has been moved to the position DEP$_2$.

When this step 228 is completed, the AF control sub-routine is finished so that the process returns to Step 9.

If the switch SW$_1$ is still kept in on state, Steps 17, 18 and 19 are executed subsequently to Step 9. If the judgment of the focusing state in the AF control sub-routine has not been completed yet, the process proceeds to Step 20 and the AF control sub-routine is executed again.

In this AF control sub-routine conducted for the second time, since the flag PRMV is set at "0" and since the flag DEPMV has been set at "1" since the execution of Step 224 in the previous AF sub-routine, the process proceeds to Step 229 via Steps 200 and 201, whereby a judgment is conducted as to whether the lens has been stopped for the same reason as Step 202. The process is returned when the lens has not been stopped.

In consequence, Steps 9, 17, 18, 19 and 20 (Steps 200, 201 and 229) are executed repeatedly as long as the lens is being driven. When the stop of the lens is confirmed, the process proceeds to Step 230.

Step 230:
This step is the same as Step 225 explained before. In this step, the count value FCNT obtained when the lens is stopped after the start of the second depth processing is input.

It is assumed here that the pulse number FP determined in Step 223 of the second depth processing is N$_2$. In such a case, the lens is driven until N$_2$ pieces of pulses are received from the encoder ENC. The number of the pulses which are counted by the time of completion of driving of the lens is N$_1$+N$_2$, where N$_1$ represents the number of pulses corresponding to the lens position DEP$_1$ (see FIG. 3) where the first depth processing is completed. After completing this step, the process proceeds to Step 231.

Step 231:
The count value representing the instnnt position of the lens as obtained in Step 230 is subtracted from the value determined in Step 228 and stored in the memory STLPOS. As explained above, the value in the memory STLPOS represents the position at which the lens is expected to be positioned after it is driven by the amount corresponding to the defocus amount determined in the second depth processing following the first depth processing. Thus, when the count value as obtained at the time of completion of the first display processing is N$_1$ while the number of pulses crrresponding to the defocus amount from this position is N$_2$, the content of the counter is represented by N$_1$+N$_2$. As a result, the result of the subtracting computation becomes zero when the lens has been driven by the amount corresponding to the defocus amount.

Step 232:
This step is for detecting whether a lens drive unable state exists. This detecting operation is executed in the same way as that for detecting the lens stop signal explained before.

If the judgment in Step 232 has proved that the lens has been stopped for a reason other than the lens drive unable state, the process proceeds to Step 233.

Step 233:

In this step, a judgment is conducted as to whether the absolute value of the result of the computation executed in Step 231 is not smaller than 4 or less. If the lens has been driven precisely by the amount corresponding to the defocus amount determined in the second depth processing, the result of the computation executed in Step 231 is zero.

In some cases, however, the lens may have not been driven by the amount corresponding to the defocus amount, or the lens may have overrun due to inertial even when the motor is stopped when the lens has been driven by the distance corresponding to the defocus amount. In such a case, the value of the result of the computation will become greater as the amount of shortage of the travel is the lens is smaller. The computation result also will become greater as the amount of overrun becomes greater.

In this step, the lens is driven by the amount corresponding to the defocus amount when the result of the computation is 4 or smaller, and it is judged that the lens has been driven to the lens position determined in Step 228. In this case, therefore, flags DEPMV and DEPJF are set at "0" and "1", respectively, thus completing the AF control sub-routine.

Conversely, when the judgment conducted in Step 233 has proved that the result of the computation performed in Step 31 is greater than 4, it is judged that the lens has not been moved yet to the expected position, so that the lens drive instruction is given again to drive the lens. Thereafter, the process is returned to complete the AF control sub-routine.

Assume here that the judgment in Step 233 has proved that the lens has not been driven yet to the expected position, and that the poocess has been returned to Step 9 after completing the AF control sub-routine subsequently to the driving of the lens in Step 236.

If the switch $SW_1$ is held in on state, the series of steps 17, 18, 19 and 20 (200, 201 and 229) are sequentially executed repeatedly until the lens is stopped. Then, upon confirmation of the stop of the lens, the aforementioned series of steps 230, 231, 232 and 233 are executed again. In consequence, the result of computation executed in Step 231 becomes less than 4 so that the completion of the driving of the lens to the expected position is confirmed.

When the completion of the driving of the lens to the expected position has been confirmed, Steps 234 and 235 are executed, otherwise the described process is repeated in Step 233 until the arrival of the lens at the expected position determined in Step 228 is confirmed. Thus, the series of steps 200, 201, 229, 230, 231, 232, 233 and 236 ensure that the lens is precisely located at the expected lens position determined in the second depth processing. The above-described operation is conducted when the judgment in Step 232 has proved that the lens is not in the lens drive unable state. When the judgment in Step 232 has proved that the lens drive is unable to be conducted due to, for example, stopping by the infinite limit of the lens stroke, the process proceeds from Step 232 to Step 237.

Step 237:

In this step, a judgment is conducted as to whether the lens drive unable state has been caused due to stopping of the lens at the infinite side end of the lens stroke.

This judgment is conducted as follows. As explained before, the defocus amount DEF contains information concerning the direction in which the lens is to be driven. Therefore, the pulse number FP computed in accordance with the defocus amount DEF is provided with a positive or negative sign which represents the driving direction, so that whether the lens has been driven towards the infinite stroke end is judged by examining the sign of the pulse number FP.

When the lens drive unable state has taken place during driving of the lens twwards the infinite side, i.e., when the lens has been stopped at the infinite side end of the lens stroke, the process proceeds to Step 234 so that the same process as that conducted when the lens has been driven correctly is executed.

Conversely, when the judgment in Step 237 has proved that the lens has been driven towards the closer side, i.e., when the lens drive unable state has been cause due to contact of the lens with the closer end limit of the lens stroke, the process proceeds to Step 238 in which the flag $DEP_1$ is set at "1", while the flags $DEP_2$, $DEP_3$ and DEPDN are set at "0", and then the process proceeds to Step 239 in which an NG display is conducted on the display device DSP, thus completing the AF sub-routine.

Therefore, when the lens drive unable state is caused in the second depth processing due to contact with the closest end of the lens stroke, i.e., when the desired photographing is impossible to conduct seen by a further depth processing, the depth processing is ceased to conduct the NG display thereby informing the use of the depth processing unable state, thus enabling the user to re-start the depth processing.

The stopping of the lens at the infinite end of the lens stroke is regarded as being a result of the normal focusing operation, because there is no focal point beyond the infinite end so that no further focusing is possible even when the depth processing is repeated. In such a case, the object fccused by the lens positioned at the infinite end of the lens stroke is regarded as being the object which is aimed at in the second depth processing, thus enabling subsequent process to be commenced.

In the camera of the present invention, the lens is controlled to the expected position in the second depth processing by a servo control (closed loop control). The reason why this control is executed is as follows. In the depth mode operation of the camera of the present invention, when the lens has been moved to the position determined in the second depth processing, the defocus amount is calculated from this position in relation to the lens position determined in the first depth processing, and the thus obtained defocus amount is divided by 10/17 or 7/17 so as to determine the third position to which the lens is to be moved. Therefore, the lens has to be moved precisely by the amount corresponding to the defocus amount in the second depth processing, in order to attain a high precision of detemmination of the third lens position, thus requiring a servo control which ensures a high precision of position control.

The use of the servo control in the second depth processing also provides an advantage in that the lens is correctly moved to the expected position in the second' depth processing even when the switch $SW_1$ is turned off during driving of the lens in this processing. Namely, when the switch $SW_1$ is turned off during the second depth processing, the process proceeds from Step 9 to Step 10, so that the lens is stopped. Then, Steps 9 to 15 are repeatedly executed as long as the switch $SW_1$ is kept off and, when the switch $SW_1$ is turned on again, the process proceeds to execute Steps 7, 17, 18, 19 and 20. In this state, the flag DEPMV is set at "1" so that the process proceeds to Step 20 in response to the next turning on of the switch SW$_1$. Then, after execution of the AF control sub-routine, Steps 200, 201, 229 and 230 are executed thereby commencing the operation described before. It is to be noted that the lens stop signal also is formed when the lens is stopped in response to the lens stop instruction given in Step 10. Therefore, as the switch SW$_1$ is turned on again, the process proceeds to Step 230 so that a count value corresponding to the position at which the lens has been stopped at the time of turiing off of the switch SW$_1$ is input as the signal FCNT, whereby the lens is driven in the described manner by an amount corresponding to the difference between the position represented by the signal FCNT and the expected position determined in Step 228. Therefore, even if the switch SW$_1$ is accidentally or unintentionally turned off during driving of the lens in the second depth processing, the driving of the lens is commenced again if the switch SW$_1$ is turned on again, whereby the lens is driven to the expected position, thus assuring that the lens is always set at the correct position.

When the driving of the lens to the expected position is completed, Steps 234 and 235 are executed as described before, so that the AF control sub-routine is finished to allow the process to proceed to Step 9.

If the switch SW$_1$ has been turned on in this state, the process proceeds from Step 9 to sequentially execute Steps 17, 18 and 19. Since "1" was set in the flag DEPJF in Step 235, the process further proceeds from Step 19 to Step 21. Since the flag DEPOK has been set at "0", the process proceeds from Step 21 to Step 22. When the second depth processing is commenced, the flags DEP$_1$ and DEP$_2$ are set a "0" and "1", respectively, in Step 24 as explained before. Therefore, the process proceeds from Step 22 to Steps 26, 27 and 28, so that the DEP$_2$ display indicative of the completion of the second depth processing is displayed on the display device DSP. At the same time, the flags DEP$_2$ and DEP$_3$ are set at "0" and "1", respectively. Then, after setting the flag DEPOK at "1", the process proceeds again to Step 9.

If the switch SW$_1$ is still maintained on in this state, processes 9, 17,18, 19 and 21 are cyclically executed so that the lens is held at the position determined in the second depth processing, whereby the second depth processing is completed.

Then, the switch SW$_1$ is turned off and then turned on again so that the process proceeds to execute Steps 9, 17, 18 and 19. Since the switch SW$_1$ was once turned off, the process of Step 13 has been completed, so that "0" hasbbeen set both in the flags DEDJF and DEDOK. In consequence, the process proceeds from Step 19 to Step 20, thus executing the AF control sub-routine again.

Since the "0" level which was set in the flag DEPMV in Step 234 is still maintained, the AF control sub-routine is commenced to execute Steps 200, 201, 204 and 205. The "0" level of the flag DEP$_1$ set in Step 24, as well as "0" and "1" levels of the flags DEP$_2$ and DEP$_3$ set in Step 28, is still maintained so that the process proceeds from Step 205 to 240 thereby executing Step 240.

Step 240:

The state of the flag DEP$_2$JF is judged in this step. This flag DEP$_2$JF is adapted to be set at "1" only when Step 223 is executed during the second depth processing, i.e., only when the object aimed at in the first depth processing and the object aimed at in the second depth processing are located substantially at the same position.

Therefore, when the first and the second depth processings are conducted on objects which are spaced apart from each other, the process proceeds to Step 241.

It is assumed here that the process has proceeded to Step 241.

Figure 3:
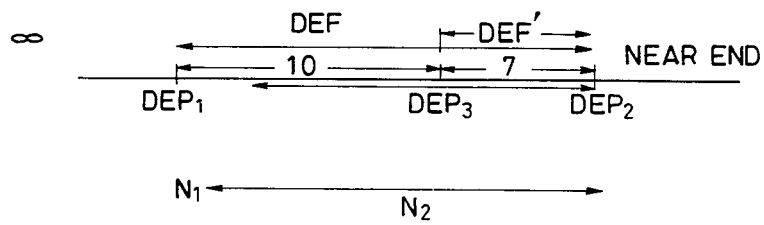
FIGS. 3, 4 and 5 are illustrations of operation of the first embodiment.

Step 241:

In this step, a subtracting operation is computed to determine the difference between the pulse number FP input to the memory DEPFP in Step 227, i.e., the number of pulses corresponding to the defocus amount to the lens position determined in the second depth processing, and the pulse number obtained in Step 231 when the lens has been moved to the expected position through Steps 233 to 235. As shown in FIG. 3, the count value representing the lens position DEP$_2$ expected after the second depth processing is expressed by $N_1+N_2$, where $N_1$ represents the pulse count number corresponding to the lens position DEP$_1$ determined through the first depth processing, while $N_2$ represents the pulse count number corresponding to the defocus amount obtained through the second depth procsssing.

Figure 4:
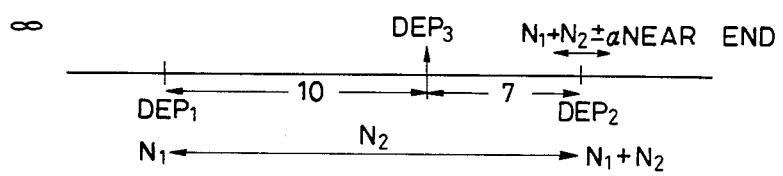

In Steps 230 to 236, the lens is driven until the difference between the expected lens position and the instant lens position becomes smaller than an amount which corresponds to four pulses. Therefore, the count value representing the lens position DEP$_2$ to which the lens is actually moved through the second depth processing is represented by $N_1+N_2\pm\alpha$, $4\geq\alpha\geq-4$, as shown in FIG. 4. Thus, there is an offset $\pm\alpha$ between the expected lens position and the actual lens position.

In Step 231, the difference between the expected position and the actual lens position $(N_1+N_2)-(N_1+N_2\pm\alpha)$ is computed whereby the offset amount $\pm\alpha$ is determined.

In Step 241, a subtracting operation is conducted to determine the difference between the pulse number $N_2$ corresponding to the defocus amount determined in the second depth processing and the offset amount $\pm\alpha$ is executed so that the actual amount $N_2\pm\alpha$ of movement of the lens from the lens position DEP$_1$ determined in the first depth processing and the actual lens position after the completion of the second depth processing is determined. This actual lens driving amount $N_2\pm\alpha$ is input to the memory DEP$_2$FP.

Thus, according to the invention, since the operation relies upon the detection of the actual lens positions DEP$_1$ and DEP$_2$, it is possible to correctly detect the actual amount of movement of the lens between the lens positions DEP$_1$ and DEP$_2$ even when the lens has been stopped due to, for example, stopping at the infinite end of the lens stroke.

After the determination of the lens driving amount between the lens positions DEP$_1$ and DEP$_2$ in Step 241, the process proceeds to Step 242 in which a judgment is conducted as to the sign, i.e., whether plus or minus, of the defocus amount from the lens position DEP$_1$ to the lens position DEP$_2$ as obtained in the second dephh processing. As explained before, the defocus amount DEF contains data which represents the direction of the defocus, i.e., the direction in which the lens is to be driven. It is thus possible to know in which direction the lens is to be moved from the position DEP$_1$ to the position DEP$_2$, by judging the sign of the defocus amount DEF. In this embodiment, the driving direction towards the closer side is assumed to be positive direction, while the driving direction towards the infinite side is assumed to be negative direction.

When the positional relationship between the lens positions is as shown in FIG. 4, the lens is moved towards the closer side during driving from the position $DEP_1$ to the position $DEP_2$, the defocus amount DEF carries a positive sign so that the process proceeds to Step 243.

Step 243:

In this step, a computation is conducted to determine the pulse number which corresponds to 17/17 of the pulse number representing the driving amount between the positions $DEP_1$ and $DEP_2$, which driving amount being computed in Step 241. The thus obtained pulse number corresponds to the lens driving amount from the position $DEP_2$ to the position $DEP_3$, as will be seen from FIG. 4.

When the detection of the driving direction conducted in Step 242 has proved that the driving direction is the positive direction, Step 244 is executed in place of Step 243.

Figure 5:
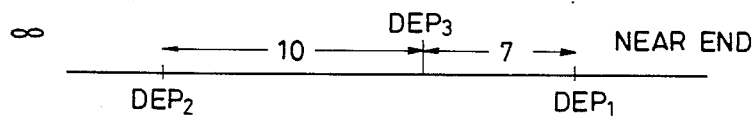

The relationship between the positions $DEP_1$ and $DEP_2$ is as shown in FIG. 5. In Step 244, therefore, the pulse number corresponding to 10/17 of the distance between the lens positions $DEP_1$ and $DEP_2$ is computed. The thus obtained pulse number corresponds to the amounts by which the lens is to be driven from the position $DEP_2$ to the position $DEP_3$.

According to this method, it is possible to obtain the number of pulses corresponding to the amount of movement of the lens from the lens position $DEP_2$ to the lens position $DEP_3$ which divides the distance between the lens positions $DEP_1$ and $DEP_2$ such that the ratio between the lens position $DEP_3$ and the focused lens position on the infinite side and the lens position $DEP_3$ and the focused lens position on the closer side is 10:7, regardless of the direction of driving of the lens in the second depth processing, whereby the lens can be moved to the third position $DEP_3$ without fail.

After determining the number of pulses from the encoder required for moving the lens from the lens position $DEP_2$ to the lens position $DEP_3$ either in Step 243 or in Step 244, the process proceeds to Step 224.

In Step 224, the lens is moved from the lens position $DEP_2$ by an amount corresponding to the pulse number determined in Step 243 or 244, as in the case of the lens driving operation in the second depth processing, whereby the lens is set at the position $DEP_3$. In consequence, the flag DEPMV and the flag DEPJF are set at "0" and "1", respectively, in Steps 234 and 235.

More specifically, in Step 227 which is executed in the third depth processing, the pulse number corresponding to the amount of movement of the lens from the position $DEP_2$ to the position $DEP_3$ as determined either in Step 243 or 244 is stored in the memory DEPFP, while, in Step 228, the count value representing the lens position $DEP_3$ is stored in the memory STLPOS.

Thus, after conducting the Step 244 or 243, Steps 224 to 228 are executed and then the process proceeds to Step 9. Thereafter, as long as the switch $SW_1$ is held on, Steps 9, 17, 18, 19, 20 (200, 201, 229) or Steps 20 (200 201, 229, 230, 231, 232, 233, 236) or Steps 20 (200m 201, 229, 230, 231, 232 237) are repeatedly executed as in the case of the lens driving in the second depth process. Thus, the lens is driven until the difference between the count value stored in the memory STLPOS (position $DEP_3$) and the count value representing the instant lens position comes to fall within ±4. When the lens has been moved to a position which is within ±4 in terms of the pulse number from the position $DEP_3$, the flags DEPMV and the flag DEPJF are set at "0" and "1", respectively, in Steps 234 and 235, whereby the lens driving in the third depth processing is completed.

The driving of the lens to the expected position is conducted by a servo control also in the third depth processing. Therefore, the lens can be driven to the expected position without fail even if the switch $SW_1$ is temporarily turned off during driving the lens. In addition, in the event that a lens drive unable state is caused due to interference of the lens with the closer limit of the lens stroke, the depth processing is no more conducted but is ceased after conducting the display of NG state. When a less drive unable state is caused by the interference of the lens with the infinite side limit of the lens stroke, the subsequent process is conducted while the lens is stationed at this position.

Figure 2F:
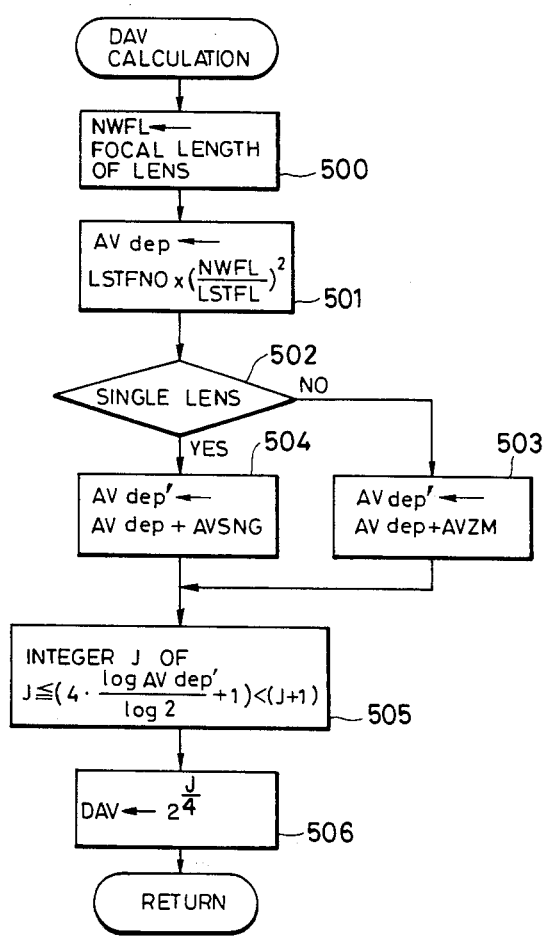

After completion of the third depth processing, Steps 9, 17, 18 and 19 are executed. In Step 19, the "1" level of the flag DEPJF is detected so that the process further proceeds to Steps 21 onwards, thereby detecting the states of the flags DEPOK, $DEP_1$, $DEP_2$, and $DEP_3$. At this moment, flags DEPOK, $DEP_1$, $DEP_2$ have been set at "0", while the flag $DEP_3$ has been set at "1". The process therefore proceeds to follow Steps 21, 22, 26, 29 and 30. In Step 30, "0" is set on the flag $DEP_3$, while "1" is set on DEPDN. The process then proceeds to Step 31 in which a DAV computing subroutine as shown in FIG. 2F is executed.

The DAV computing sub-routine is first commenced from the execution of Step 500.

Step 500:

The focal distance information of the lens is input to the memory NWFL. The focal distance information is obtained in the same way as that explained before in connection with Step 220.

Step 501:

In this step an aperture value is determined which provides a focal depth capable of enabling the lens to simultaneously focus both the object A which is precisely focused by the same lens on the position $DEP_1$ in the first depth processing and the object B which is precisely focused by the same lens on the position $DEP_2$ in the second depth processing. More specifically, Step 501 executes computation of $LSTFNOAV \times (f_n/f_1)^2$, where LSTFNOAV represents the aperture value input to the memory LSTFNO in Step 221, $f_1$ represents the focal distance information stored in the memory LSTFL and $f_n$ represents the focal distance information stored in the memory NWFL, whereby a controlled aperture value AVdep is obtained.

This computation is conducted for the purpose of obtaining an aperture value which provides a focal depth capable of enabling both objects to be focused simultaneously even if the focal distance information is changed due to a change in the zoom ratio during the depth processing.

The aperture value LSTFNOAV is the value obtained in accordance with the defocus amount when the focal distance is $f_1$. On the other hand, the defocus amount is changed in relation to the focal distance such that the, when the focal distance is increased by two times, the defocus amount is increased by four times.

It is assumed here that a defocus amount DEF is obtained when the focusing is conducted at the lens position DEP₁ with the focal distance f₁. In such a case, the defocus amount is increased to 4DEF when the same object is focused with a doubled focal distance 2f₁. The aperture value LSTFNOAV also is changed by four times when the focal distance is increased by two times.

Therefore, when the focal distance with which the object is photographed has been changed, due to, for example, zooming, from the focal distance with which the aperture value STFNOAV was obtained, there is a risk that the aperture value LSTFNOAV cannot provide the desired focal depth which enables the lens to focus on both objects simultaneously.

According to the invention, therefore, the controlled aperture value AVdep computed as LSTFNOAV $(f_n/f_1)^2$ is used as the aperture value instead of the fixed aperture value, whereby the aperture value is increased by four times when the focal distance has been changed by two times from that in the determination oftthe LSTFNOAV.

After completion of Step 501, the process proceeds to Step 502.

Step 502:

In this step, a judgment is conducted as to whether the lens assembly now on mounted on the camera is a zoom lens or a fixed-focus type lens.

This judgment is conducted in the same manner as the transfer of the focal distance information from the lens to the camera. Namely, the computer PRS appoints the circuit LPRS so that the zoom lens information or the fixed-focus lens information stored in the RAM of this circuit is read and input to the computer PRS. The computer PRS then examines this input information so as to judge whether the mounted lens assembly is of a zoom type or a fixed-focus type. Different lens assemblies have different types of lens information. Thus, zoom lens information concerning the zoom lens and fixed-focus type lens information concerning the fixed-focus type lens are stored beforehand in the RAMs of the respective lens assemblies.

If the judgment conducted in this step has proved that the presently mounted lens is a zoom lens, Step 503 is executed so that a constant value AVZM is added to the above-mentioned aperture value AVdep, whereby a corrected control aperture value $AV_{dep}'$ is obtained. By the addition of the constant value AVZM, the aperture value is slightly shifted towards the smaller side, i.e., in such a direction as to provide a greater focal depth, from the computed aperture value AVdep.

This adding operation is conducted for the purpose of absorption of any error regarding the computed aperture value AVdep which may be incurred during determination of the aperture value AVdep due to various factors. Namely, any slight error becomes negligible by setting the actual aperture value to provide a focal depth slightly greater than the depth provided by the computed aperture value.

When the judgment in Step 502 has proved that the lens now mounted on the camera is a fixed-focus type lens, Step 504 is executed in place of Step 503.

In Step 504, a constant value AVSNG is added to the aperture value AVdep, whereby a corrected control aperture value AVdep' is determined. This adding operation is conducted for the purpose of absorption of error as in the case of the zoom lens.

The above-mentioned constant values ASNS and AVZM are determine to meet the condition of ASNG<AVZM. This condition is determined to provide a greater amount of correction for the zoom lens which has a greater number of error factors than the fixed-focus type lens.

After determining the corrected aperture value AVdep', the process proceeds to Step 505.

Step 505:

In this step, a computation is conducted to determine an integer J which meets the condition of the following formula (1).

$$J \leq \left(4\left(\frac{\log AVdep'}{\log 2}\right)+1\right) < (J+1) \quad (1)$$

The integer J has a value which is twice as large the apex value. It is therefore possible to determine an apex aperture value having a ½ stage precision of the apex value, by determining the integer J.

The formula (1) is obtained by transforming the following formula (2).

$$(2^{\frac{1}{4}})^{J-1} \leq AVdep' < (2^{\frac{1}{4}})^J \quad (2)$$

The integer J can be obtained in precise correspondence to AVdep, from the following formula (3).

$$(2^{\frac{1}{4}})^J = AVdep' \quad (3)$$

The value J derived from the formula (3) includes not only integers but also decimals. By determining J in accordance with the formula (1) derived from the formula (2), the decimal portions determined in formula (3) are rounded up.

Thus, the aperture value J obtained from the formula (1) is a value which is twice as large the apex value of the aperture value AVdep' and rounded up with a ½ stage precision. Thus, the aperture value J has been increased from the aperture value AVdep' so as to provide a greater focal depth, further increasing the capability of error correction. Thereafter, the process proceeds to Step 506 in which $2^{J/4}$ is computed for the value J determined in Step 506, whereby actual aperture numbers are obtained at an interval of ½ apex state.

The operation in Step 505 is conducted for the purpose of obtaining a matching between the desired aperture values and the stages of aperture control mechanism of the camera. Since the desired aperture values are determined on the basis of the ½ apex stage, so that controlling stage precisions on the order of ½ⁿ such as ⅛, ¼, ⅓ etc., are available for the camera mechanism.

After the completion of the DAV computing sub-routine, the process proceeds to Step 32 which executes the DAV display sub-routine. In this sub-routine, the real number of the aperture value obtained through the DAV sub-routine is displayed on the display device DSP. The display operation is conducted in the same manner as that explained before.

The process then proceeds form Step 32 to Step 33 so as to allow the shutter to be released. The process then proceeds to Step 25 in which the flag DEPOK is set at "1". The process then returns to Step 9. If the switch SW₁ is held on in this state, Steps 9, 17, 18, 19 and 21 are repeatdly executed. If the switch SW₁ is accidentally turned off in this state, steps 9, 10, 12, 14 and 15 are repeatedly executed and, when the switch SW₂ is turned on again, Steps 9, 17, 18, 19 and 21 are repeatedly executed to recover the state before the switch is turned off. Thus, the result of the depth processing is maintained even if the switch SW₁ is accidentally turned off after completion of the depth processing.

When the shutter button is pressed deeper to complete its second stroke portion, an interruption is conducted to execute a release processing in the AE control sub-routine of Step 3. As a result, the signal corresponding to the result of the computation is transmitted from the computer PRS as the signal SO to the circuit LPRS through the circuit LCM. Therefore, the step motor DMTR is driven to activate the apertuee mechanism to set the aperture at the value J mentioned above. At the same time, the shutter release operation is conducted so that the shutter is released at a shutter speed which is determined both by the light value measured in Step 17 and the aperture value given by J.

As a result of the series of operation in the depth mode described hereinbefore, the lens is set at a photographing lens position which divides the distance between two spaced-apart objects at such a ratio that the distance between the closer side focal point focusing on one of the object and the photographing to the distance between the photographing lens position and the infinite side focal point focusing on the other object is 7:10. With the lens set at this position, the objects are photographed with an aperture value which provides a focal depth large enough to enable both objects to be materially focused.

In the second and the third depth processings, the actual lens driving amounts are determined on the basis of the pulse number corresponding to the defocus amount determined in the second depth processing, and the lens is driven precisely by the thus determined amount. Therefore, the lens can always be set at the above-mentioned photographing lens position which divides, at the ratio of 7/17, the distance between the focusing lens positions for focusing both objects.

The depth mode operation is so programmed as to prevent the shutter release operation by pressing of the switch SW₂ from being started until the third depth processing is completed. Therefore, even if the release button is further pressed to complete the second stroke portion during execution of the depth processing, the depth mode is maintained without being interrupted. Thus, the operation in the depth mode can be completed when the shutter button is accidentally operated to the releasing position during execution of the depth processing.

The counter used in the described embodiment is adapted to up-count and down-count the pulses derived from the encoder ENC, so that the content of this counter always represents the position of the lens after the driving. In addition, the driving of the lens by the defocus amount is conducted by driving the lens until the variance from the count value in the state before the driving becomes equal to the value corresponding to the defocus amount, through comparison between the variance and the value corresponding to the defocus amount. This lens controlling method, however, is only illustrative and other suitable control method may be used instead.

The abutment of the lens with the infinite side or closest side lens stroke limits may be detected by means of limit switches located at these limits of the lens stroke.

The arrangement also may be such that the judgment as to whether the lens is possible to abut one of the stroke limits when the lens is driven by the defocus amount in the second depth processing may be conducted through a comparison between the computed defocus amount and the distance between the distance between the instant lens position and the stroke limit with which the lens may contact. In this case, however, it is necessary that an absolute value data be detected from the lens as the instant lens information.

As will be understood from the foregoing description, according to the invention, when the lens is stopped upon abutment with the closer side limit of the lens stroke, subsequent depth processing is canceled and an alarm is activated to inform the user of this fact. Conversely, whe the lens is stopped upon contact with the infinite side limit of the lens stroke, the ordinary depth processing is executed without interruption.

Thus, according to the present invention, it is possible to obtain a camera which is suitable for conducting a depth processing for enabling different objects to be photographed in simultaneously focused state.

Furthermore, in the camera of the present invention, the lens driving operation in the second depth processing is prohibited when the defocus amount is too large or when the contrast is too low. Thus, the second depth processing is commenced only after the defocus amount has been decreased to a level below a predetermined value or after the contrast has been increased to a sufficiently high level. Thus, the camera of the present invention enables both objects to be photographed simultaneously in the focused state.

Furthermore, since the lens driving amount in the second depth processing is controlled in conformity with the defocus amount, it is possible to obtain a state in which both objects are focused exactly.

We claim:

1. A camera having an automatic focusing device comprising:
    (a) a focus detection circuit for detecting a state of focusing of an image forming optical system;
    (b) a driving circuit for driving said image forming optical system between a first in-focus position where said image forming optical system is focused on a first object and a second in-focusing position where said image forming optical system is focused on a second object, said first and second in-focus positions being detected by said focus detection circuit;
    (c) discrimination means for discriminating whether one or said first and second in-focus positions is beyond a driving limit of said image forming optical system; and
    (d) prohibiting means for prohibiting the driving of said image forming optical system to an intermediate position between said first and second in-focus positions when said discrimination means has discriminated that one of said first and second in-focus positions is beyond a driving limit of said image forming optical system.

2. A camera having an automatic focusing device according to claim 1, wherein said focus detection circuit is adapted to detect the state of focusing of said image forming optical system on said second object while said image forming optical system is positioned at said first in-focus position focusing on said first object, said driving means being adapted for driving said image forming optical system from said first in-focus position to said second in-focus position in accordance with the state of focusing on said second object, said discrimination means being adapted for detecting the state of driving of said image forming optical system towards said second in-focus position and for producing an output when said image forming optical system has been moved to reach said limit position, whereby said prohibiting means conducts the prohibiting operation in response to the output from said discrimination means.

3. A camera having an automatic focusing device according to claim 2, wherein said driving limit of said image forming optical system is a closer-side limit of the stroke of said image forming optical system.

4. A camera having an automatic focusing device comprising:
   (a) a focus detection circuit capable of producing a focus signal corresponding to a state of focusing of an image forming optical system;
   (b) a driving circuit for driving said image forming optical system in accordance with the focusing signal from said detection circuit;
   (c) a drive control circuit capable of taking a first state in which said drive control circuit drives said image forming optical system to a first in-focus position where said image forming system focuses on an object by controlling said driving circuit in accordance with the focus signal from said focus detection circuit, a second state in which said drive control circuit drives said image forming optical system from said first in-focus position to a second in-focus position where said image forming system focuses on another object by controlling said driving circuit in accordance with the focus signal from said focus detection circuit, and a third state in which said drive control circuit drives said image forming optical system to an intermediate position between said first and second in-focus positions;
   (d) a manual operation means for switching said drive control circuit from said first state to said second state and from said second state to said third state;
   (e) detection means capable of producing an output upon detection of the arrival of said image forming optical system at a driving limit of said image forming optical system during driving of said image forming optical system towards said second in-focus position when said drive control means is in said second state; and
   (f) prohibiting means for prohibiting the operation of said drive control circuit in said third state in response to the output from said detection means.

5. A camera having an automatic focusing device according to claim 4, wherein said prohibiting means is adapted for prohibiting the switching of said drive control circuit to said third state.

6. A camera having an automatic focusing device according to claim 4, wherein said driving limit of said image forming optical system is a closer-side limit of the stroke of said image forming optical system.

7. A camer having an automatic focusing device comprising:
   (a) a focus detection circuit capable of producing a focus signal corresponding to a state of focusing of an image forming optical system;
   (b) a driving circuit for driving said image forming optical system in accordance with the focusing signal from said detection circuit;
   (c) a drive control circuit capable of taking a first state in which said drive control circuit drives said image forming optical system to first in-focus position where said image forming system focuses on an object by controlling said driving circuit in accordance with the focus signal from said focus detection circuit, a second state in which said drive control circuit drives said image forming optical system from said first in-focus position to second in-focus position where said image forming system focuses on another object by controlling said driving circuit in accordance with the focus signal from said focus detection circuit, and a third state in which said drive control circuit drives said image forming optical system to an intermediate position intermediate between said first and second in-focus positions;
   (d) a manual operation means for switching said drive control circuit from said first state to said second state and from said second state of said third state;
   (e) computing means for computing the actual driving amount of said image forming optical system from said first in-focus position to said second in-focus position in the second state of said drive control circuit;
   (f) dividing means for internally dividing the driving amount computed by said computing circuit into two parts; and
   (g) restriction means for restricting the driving of said image forming optical system from said second in-focus position in said third state of said drive control means to a driving amount internally divided by said dividing means.

8. A camera having an automatic focusing device comprising:
   (a) a focus detection circuit capable of producing a focus signal corresponding to a state of focusing of an image forming optical system;
   (b) a driving circuit for driving said image forming optical system in accordance with the focus signal from said detection circuit;
   (c) a drive control circuit capable of taking a first state in which said drive control circuit drives said image forming optical system to a first in-focus position where said forming system focuses on an object by controlling said driving circuit in accordance with the focus signal from said focus detection circuit, a second state in which said drive control circuit drives said image forming optical system from said first in-focus position to a second in-focus position where said image forming system focuses on another object by controlling said driving circuit in accordance with the focus signal from said focus detection circuit, and a third state in which said drive control circuit drives said image forming optical system to an intermediate position between said first and second in-focus position;
   (d) a manual operation means for switching said drive control circuit from said first state to said second state amd from said second state to said third state; and
   (e) prohibiting means for prohibiting the driving of said image forming optical system in said second state of said drive control circuit when the level of said focus signal derived from said focus detection circuit in said second state of said drive control circuit exceeds a level corresponding to a predetermined amount of drive of said image forming optical system.

9. A camera having an automatic focusing device according to claim 8, wherein, when said prohibiting means is operating, said focus detection circuit repeatedly conducts the focus detecting operation, and prohibition of the driving by said prohibiting means is dismissed when the driving amount represented by said focus signal obtained during repetition of focus detecting operation has become smaller than a predetermined value, thereby allowing said drive control circuit to control the driving of said image forming optical system in said second state in accordance with said focus signal.

10. A camera having an automatic focusing device according to claim 8, wherein said prohibiting means includes comparing means adapted for comparing said focus signal with a predetermined value and for producing an output when the driving amount represented by said focus signal exceeds said predetermined value, said drive control means being adapted for prohibiting the control of driving of said image forming optical system in accordance with the output from said comparing means.

11. A camera having an automatic focusing device comprising:
 (a) a focus detection circuit for detecting a state of focusing of an image forming optical system;
 (b) a driving circuit for driving said image forming optical system between a first in-focus position where said image forming optical system is focused on a first object and a second in-focus position where said image forming optical system is focused on a second object, said first and second in-focus positions being detected by said focus detection circuit;
 (c) discrimination means for discriminating whether the output of said focus detection circuit upon detection of the focusing state on one of said first and second objects represents a correct focusing state; and
 (d) prohibiting means for prohibiting the driving of said image forming optical system in response to the result of the focus detection, when said discrimination means has judged that the output of said focus detection circuit does not represents the correct focusing state.

12. A camera having an automatic focusing device according to claim 11, wherein said focus detection circuit is adapted to detect the state of focusing of said image forming optical system on said second object when said image forming optical system is positioned at said first in-focus position where it is focused on said first object, said discrimination means being adapted for discriminating whether the state of focusing on said second object as detected by said focus detection circuit is correct.

13. A camera having an automatic focusing device according to claim 12, wherein said driving circuit is adapted for driving said image forming optical system to said second in-focus position in accordance with the state of focusing of said image forming optical system on said second object, and for driving the same from said second in-focus position to a position which internally divides the distance between said first and second in-focus positions at a predetermined ratio, and wherein said prohibiting means prohibits the driving of said image forming optical system to said second in-focus position when said discrimination means has discriminated that the detected state of focusing on said second object does not represent the correct focusing state.

14. A camera having an automatic focusing device according to claim 11, wheein said focus detection circuit has light-receiving elements for receiving the image of said first and second objects through said image forming optical system and a processing circuit for detecting the focusing state on the basis of the output from said light receiving elements, said processing circuit being adapted for outputting a contrast signal representing the contrast of said image received by said light receiving elements, said discrimination means being adapted for receiving said contrast signal and discriminating that said output from said focus detection circuit does not represent the correct focusing state when said contrast value is lower than a predetermined value.

15. A camera having an automatic focusing device comprising:
 (a) a focus detection circuit capable of producing a focus signal corresponding to a state of focusing of an image forming optical system;
 (b) a driving circuit for driving said image forming optical system in accordance with the focusing signal from said detection circuit;
 (c) a drive control circuit capable of taking a first state in which said drive control circuit drives said image forming optical system to a first in-focus position where said image forming system focuses on an object by controlling said driving circuit in accordance with the focus signal from said focus detection circuit, a second state in which said drive control circuit drives said image forming optical system from said first in-focus position to a second in-focus position whee said image forming system focuses on another object by controlling said driving circuit in accordance with the focus signal from said focus detection circuit, and a third state in which said drive control circuit drives said image forming optical system to position intermediate between said first and second in-focus positions;
 (d) a manual operation means for switching said drive control circuit from said first state to said second state and from said second state to said third state;
 (e) discrimination means for discriminating whether the focus signal from said focus detection circuit properly represents the focusing state; and
 (f) prohibiting means for prohibiting the driving of said image forming optical system by said drive control circuit according to the focus signal in said second state when said discrimination means has discriminated that the focus signal derived from said focus detection circuit in said second state of said drive control circuit does not properly represents the focusing state.

16. A camera having an automatic focusing device according to claim 15, wherein said focus detection circuit has light-receiving elements for receiving the image of said object through said image forming optical system and a processing circuit for detecting the focusing state on the basis of the output from said light receiving elements, said processing circuit being adapted for outputting a contrast signal representing the contrast of said image received by said light receiving elements, said discrimination means being adapted for receiving aid contrast signal and discriminating that said output from said focus detection circuit does not represent the correct focusing state when said contrast value is lower than a predetermined value.

17. A camera having an automatic focusing device comprising:
 (a) a focus detection circuit for detecting a state of focusing of an image forming optical system;
 (b) a driving circuit for driving said image forming optical system between a first in-focus position where said image forming optical system is focused on a first object and a second in-focus position where said image forming optical system is focused on a second object, said first and second in-focus position being detected by said focus detection circuit;

(c) discrimination means for discriminating whether the distance between said first in-focus position and said second in-focus position exceeds a predetermined amount; and (d) prohibiting means for prohibiting the driving of said image forming optical system corresponding to the result of the focus detection when said discrimination means has discriminated that the distance between said first and second objects is greater than a predetermined value.

18. A camera having an automatic focusing device comprising:

(a) a focus detection circuit capable of producing a focus signal corresponding to the state of focusing of an image forming optical system;

(b) a driving circuit for driving said image forming optical system in accordance with the focusing signal from said detection circuit;

(c) a drive control circuit capable of taking a first state in which it drives said image forming optical system to a first in-focus position where said image forming system focuses on an object by controlling said driving circuit in accordance with the focus signal from said focus detection circuit, a second state in which it drives said image forming optical system from said first in-focus position to a second in-focus position where said image forming system focuses on another object by controlling said driving circuit in accordance with the focus signal from said focus detection circuit, and a third state in which it drives said image forming optical system to an intermediate position between said first and second in-focus positions; and (d) manual operation means for switching said drive control circuit from said first state to said second state and from said second state to said third state;

(e) said drive control circuit including a first state control means for alternately effecting, in said first state, the focus detection by said focus detection circuit and the driving operation of said image forming optical system by said driving circuit on the basis of the focus signal as a result of the focus detection until said focus detection circuit outputs a signal representing an in-focus state, a second state control means for conduciing, in said second state, the driving of said image forming optical system in accordance with the focus signal output from said focus detection circuit and then prohibiting the driving of said image forming optical system, and a third state control means for holding, in said third state, said image forming optical system at said intermediate position between in-focus positions of said first and second states after said image forming optical system has been moved to said position.

19. A camera having an automatic focusing device according to claim 18, wherein said second state control means includes a calculating circuit for calculating the amount of drive of said image forming optical system corresponding to the focus signal from said focus detection circuit position information concerning the position of said image forming optical system before the driving in said second state, and comparing means for comparing the result of calculation performed by said calculation circuit with a position information concerning the position of said image forming optical system after said image forming optical system is moved in accordance with said focus signal in said second state.

20. A camera having an automatic focusing device comprising:

(a) a focus detection circuit for detecting a state of focusing of an image forming optical system;

(b) a driving circuit for driving said image forming optical system between a first in-focus position where said image forming optical system is focused on a first object and a second in-focus position where said image forming optical system is focused on a second object, said first and second in-focus positions being detected by said focus detection circuit;

(c) an aperture value calculating circuit for calculating an aperture value which corresponds to the amount of defocus between said first in-focus position and said second in-focus position and which is represented by the state of focusing detected by said focus detection circuit;

(d) shifting means for shifting said aperture value calculated by said aperture value calculation circuit in such a direction as to increase the focal depth;

(e) shift amount control means for controlling the amount of shift of said aperture value in accordance with the type of the lens mounted on said camera; and (f) aperture control means for controlling the aperture of said camera in accordance with said aperture value after the shift by said shifting means.

21. A camera having an automatic focusing device comprising:

(a) a focus detection circuit for detecting a state of focusing of an image forming optical system;

(b) a driving circuit for driving said image forming optical system between a first in-focus position where said image forming optical system is focused on a first object and a second in-focus position where said image forming optical system is focused on a second object, said first and second in-focus position being detected by said focus detection circuit;

(c) discrimination means for discriminating whether one of said first and second in-focus positions is beyond a driving limit of said image forming optical system; and (d) indicating means for producing alarming indication when said discrimination means has judged that one of said first and second in-focus positions is beyond the drive limit of said image forming optical system.

22. A camera having an automatic focusing device according to claim 21, wherein said limit of driving of said image forming optical system is a closer-side limit of the stroke of said image forming optical system.

23. A camera having an automatic focusing device comprising:

(a) a focus detection circuit capable of producing a focus signal corresponding to the state of focusing of an image forming optical system;

(b) a driving circuit for driving said image forming optical system in accordance with the focusing signal from said detection circuit;

(c) a drive control circuit capable of taking a first state in which said drive control circuit drives said image forming optical system to a first in-focus position where said image forming system focuses on an object by controlling said driving circuit in accordance with the focus signal from said focus detection circuit, a second state in which said drive control circuit drive said image forming optical system from said first in-focus position to a second in-focus position where said image forming system focuses on another object by controlling said driving circuit in accordance with the focus signal from said focus detection circuit, and a third state in which said drive control circuit drives said image forming optical system to an intermediate position between said first and second in-focus positions;

(d) a manual operation means for switching said drive control circuit from said first state to said second state and from said second state to said third state;

(e) detection means capable of producing an output upon detection of the arrival of said image forming optical system at a driving limit of said image forming optical system during driving of said image forming optical system towards said second in-focus position when said drive control means is in said second state; and (f) indicating means for producing an alarming indication in response to the output of said detecting means.

24. A camera having an automatic focusing device according to claim 23, wherein said limit of driving of said image forming optical system is the closer-side limit of a stroke of said image forming optical system.

25. A camera having an automatic focusing device comprising:

(a) a focus detection circuit for detecting a state of focusing of an image forming optical system;

(b) a driving circuit for driving said image forming optical system between a first in-focus position where said image forming optical system is focused on a first object and a second in-focus position where said image forming optical system is focused on a second object, said first and second in-focus positions being detected by said focus detection circuit; and (c) discrimination means for discriminating whether the distance between said first in-focus position and said second in-focus position exceeds a predetermined amount; and (d) indicating means for producing an alarming indication when the output of said judging circuit representing said distance between said first and second in-focus positions exceeds a predetermined value.

* * * * *

UNITED STATES PATENT AND TRADEMARK OFFICE
CERTIFICATE OF CORRECTION

PATENT NO. : 4,792,819

DATED : December 20, 1988

INVENTOR(S) : AKIRA AKASHI

It is certified that error appears in the above-identified patent and that said Letters Patent is hereby corrected as shown below:

SHEET 2 OF 7

FIG. 2A, "PHOTOMETRING" should read --PHOTOMETERING--.

COLUMN 3

Line 36, "outptt" should read --output--.
    Line 61, "$101_1$" should read --$\Phi_1$--.

COLUMN 4

Line 11, "SP" should read --SPC--.
    Line 15, "signal an" should read --signal for--.

COLUMN 5

Line 26, "aloo" should read --also--.

COLUMN 6

Line 7, "the all" should read --then all--.
    Line 28, "Steps 10" should read --Step 10--.
    Line 49, "15. Thus, Steps 9 to 16" should read --16. Thus, Steps 9 to 15--.

COLUMN 7

Line 49, "charged" should read --charges--.
    Line 66, "reseective" should read --respective--.

UNITED STATES PATENT AND TRADEMARK OFFICE
CERTIFICATE OF CORRECTION

PATENT NO. : 4,792,819

DATED : December 20, 1988

INVENTOR(S) : AKIRA AKASHI

It is certified that error appears in the above-identified patent and that said Letters Patent is hereby corrected as shown below:

COLUMN 8

Line 3, "accordnnce" should read --accordance--.
    Line 6, "$\Phi$hd2" should read --$\Phi_2$--.
    Line 8, "eespective" should read --respective--.
    Line 16, "stored" should read --stores--.
    Line 32, "poriion" should read --portion--.
    Line 40, "digital," should read --digital--.

COLUMN 9

Line 31, "the executed." should read --are executed.--.
    Line 51, "PRS the" should read --PRS, whereby the--.

COLUMN 11

Line 2, "!when" should read --when--.
    Line 4, "ignal" should read --signal--.
    Line 13, "iith" should read --with--.
    Line 38, "example" should read --example,--.

COLUMN 12

Line 35, "the continues" should read --the lens continues--.
    Lines 42-43, "predetermined has" should read --predetermined time has--.
    Line 60, "cnntrol" should read --control--.
    Line 68, "dppth" should read --depth--.

UNITED STATES PATENT AND TRADEMARK OFFICE
CERTIFICATE OF CORRECTION

PATENT NO. : 4,792,819
DATED : December 20, 1988
INVENTOR(S) : AKIRA AKASHI

It is certified that error appears in the above-identified patent and that said Letters Patent is hereby corrected as shown below:

COLUMN 14

Line 2, "zooiing" should read --zooming--.
Line 53, "infinite side side object can" should read --infinite side object to--.

COLUMN 15

Line 36, "RPS a" should read --RPS as--.

COLUMN 16

Line 45, "instnnt" should read --instant--.
Lines 55-56, "crrresponding" should read --corresponding--.

COLUMN 17

Line 11, "inertial" should read --inertia--.
Line 16, "is the lens" should read --of the lens--.
Line 35, "poocess" should read --process--.

COLUMN 18

Line 9, "twwards" should read --towards--.
Line 16, "cause" should read --caused--.
Line 37, "fccused" should read --focused--.
Line 55, "detemmination" should read --determination--.

UNITED STATES PATENT AND TRADEMARK OFFICE
CERTIFICATE OF CORRECTION

PATENT NO. : 4,792,819

DATED : December 20, 1988

INVENTOR(S) : AKIRA AKASHI

It is certified that error appears in the above-identified patent and that said Letters Patent is hereby corrected as shown below:

COLUMN 19

Line 12, "turiing" should read --turning--.
    Line 35, "set a" should read --set at--.
    Line 52, "hasbbeen" should read --has been--.

COLUMN 20

Line 24, "procsssing" should read --processing--.
    Line 60, "dephh" should read --depth--.

COLUMN 21

Line 11, "17/17" should read --7/17--.
    Line 63, "(200m" should read --(200,--.
    Line 64, "232 237)" should read --232, 237)--.

COLUMN 23

Line 19, "oftthe" should read --of the--.
    Line 25, "now on" should read --now--.
    Line 66, "ASNS" should read --AVSNG--.
    Line 67, "determine" should read --determined--.

COLUMN 24

Line 22, "$(2\frac{1}{4})^j$" should read --$(2^{\frac{1}{4}})^j$-- (both times).
    Line 27, "$(2\frac{1}{4})^j$" should read --$(2^{\frac{1}{4}})^j$--.
    Line 63, "repeatdly" should read --repeatedly--.
    Line 65, "$SW_2$" should read --$SW_1$--.

UNITED STATES PATENT AND TRADEMARK OFFICE
CERTIFICATE OF CORRECTION

PATENT NO. : 4,792,819

DATED : December 20, 1988

INVENTOR(S) : AKIRA AKASHI

It is certified that error appears in the above-identified patent and that said Letters Patent is hereby corrected as shown below:

COLUMN 25

Line 10, "apertuee" should read --aperture--.

COLUMN 26

Line 12, "whe" should read --when--.
Line 33, "We claim:" should read --I claim:--.
Line 41, "second in-focusing position" should read --second in-focus position--.
Line 47, "one or said" should read --one of said--.

COLUMN 27

Line 55, "camer" should read --camera--.

COLUMN 28

Line 14, "of" should read --to--.
Line 54, "amd" should read --and--.

COLUMN 29

Line 65, "wheein" should read --wherein--.

COLUMN 30

Line 28, "whee" should read --where--.
Line 33, "to position" should read --to a position--.
Lines 47-48, "represents" should read --represent--.
Line 59, "aid" should read --said--.

UNITED STATES PATENT AND TRADEMARK OFFICE
CERTIFICATE OF CORRECTION

PATENT NO. : 4,792,819
DATED : December 20, 1988
INVENTOR(S) : AKIRA AKASHI

It is certified that error appears in the above-identified patent and that said Letters Patent is hereby corrected as shown below:

COLUMN 31

Line 51, "conduciing" should read --conducting--.

COLUMN 32

Line 52, "alarming" should read --alarm--.

COLUMN 33

Line 9, "drive" should read --drives--.

COLUMN 34

Line 1, "alarming" should read --alarm--.
    Line 6, "is the" should read --is a--.
    Line 24, "alarming" should read --alarm--.

Signed and Sealed this

Thirtieth Day of October, 1990

Attest:

HARRY F. MANBECK, JR.

*Attesting Officer*       *Commissioner of Patents and Trademarks*